(12) United States Patent
Emigh et al.

(10) Patent No.: US 9,516,048 B1
(45) Date of Patent: Dec. 6, 2016

(54) CONTAGION ISOLATION AND INOCULATION VIA QUARANTINE

(71) Applicants: Aaron Emigh, Incline Village, NV (US); James Roskind, Redwood City, CA (US)

(72) Inventors: Aaron Emigh, Incline Village, NV (US); James Roskind, Redwood City, CA (US)

(73) Assignee: Radix Holdings, LLC, Incline Village, NV (US)

( * ) Notice: Subject to any disclaimer, the term of this patent is extended or adjusted under 35 U.S.C. 154(b) by 0 days.

(21) Appl. No.: 15/206,227

(22) Filed: Jul. 9, 2016

Related U.S. Application Data

(63) Continuation of application No. 11/237,004, filed on Sep. 27, 2005, now Pat. No. 9,398,037.

(60) Provisional application No. 60/613,909, filed on Sep. 27, 2004.

(51) Int. Cl.
| | | |
|---|---|---|
| *G06F 21/50* | (2013.01) | |
| *G06F 21/56* | (2013.01) | |
| *H04L 12/22* | (2006.01) | |
| *H04L 12/24* | (2006.01) | |
| *H04L 12/26* | (2006.01) | |
| *H04L 29/06* | (2006.01) | |

(52) U.S. Cl.
CPC .......... *H04L 63/1416* (2013.01); *G06F 21/56* (2013.01); *H04L 41/082* (2013.01); *H04L 41/20* (2013.01); *H04L 63/102* (2013.01); *H04L 63/126* (2013.01); *H04L 63/1425* (2013.01); *H04L 63/1433* (2013.01)

(58) Field of Classification Search
CPC .. G06F 21/50–21/577; H04L 41/08–41/0896; H04L 41/20; H04L 41/28; H04L 63/08–63/205
USPC .......................................... 726/22–25, 2–15
See application file for complete search history.

(56) References Cited

U.S. PATENT DOCUMENTS

| | | |
|---|---|---|
| 6,823,479 B1 | 11/2004 | McElhaney et al. |
| 6,996,845 B1 | 2/2006 | Hurst et al. |
| 7,263,720 B2 | 8/2007 | Silvester |
| 7,287,278 B2 | 10/2007 | Liang |
| 7,424,610 B2 | 9/2008 | Ranganathan |
| 2002/0083328 A1 | 6/2002 | Riordan |
| 2003/0188173 A1 | 10/2003 | Zimmer et al. |
| 2003/0188194 A1 | 10/2003 | Currie et al. |
| 2005/0018618 A1 | 1/2005 | Mualem et al. |
| 2005/0033987 A1 | 2/2005 | Yan et al. |
| 2005/0131997 A1 | 6/2005 | Lewis et al. |
| 2006/0053426 A1 | 3/2006 | Dive-Reclus et al. |

OTHER PUBLICATIONS

Jing F. Sims, "Office Action, U.S. Appl. No. 11/237,003," U.S. Patent and Trademark Office, Jun. 21, 2012. Relevant passage on pp. 13-15 in the section entitled "Examiner's Statement of Reasons for Allowance."
Mark V. Glover, "Integrating a Trusted Computing Base Extension Server and Secure Session Server into the LINUX Operating System." Sep. 2001, Naval Postgraduate School.
"OLS: Linux and Trusted Computing." Jul. 22, 2005; http://lwn.net/Articles/144681/ (as retrieved on Jul. 15, 2010).
A. Bohra et al, "Remote Repair of Operating System State Using Backdoors." Proceedings of International Conference on Autonomic Computing on May 17-18, 2004, pp. 256-263.

*Primary Examiner* — Timothy J Weidner

(57) ABSTRACT

In some embodiments, techniques for protecting a network may include detecting an insecure condition on a first host that has connected or is attempting to connect to a protected network, including contacting a trusted computing base and determining whether a response includes a valid digitally signed attestation of cleanliness (an attestation that the first host is not infested and/or that the presence of a patch or patch level of a software component on the first host); if not, quarantining the first host, including by re-routing a service request sent by the first host by responding with a redirect that causes a browser on the first host to be directed to a quarantine server configured to serve a quarantine notification page that provides remediation information; and permitting the first host to communicate with a remediation host configured to provide data usable to remedy the insecure condition.

20 Claims, 25 Drawing Sheets

$t_1$ $t_2$ $t_3$

CONTAGION ISOLATION AND INOCULATION VIA QUARANTINE

CROSS REFERENCE TO OTHER APPLICATIONS

This application is a continuation of co-pending U.S. patent application Ser. No. 11/237,004, entitled Detecting and Processing Suspicious Network Communications, filed Sep. 27, 2005, which is incorporated herein by reference for all purposes, which claims priority to U.S. Provisional Patent Application No. 60/613,909 entitled CONTAGION ISOLATION AND INOCULATION filed Sep. 27, 2004, which is incorporated herein by reference for all purposes.

This application is related to U.S. patent application Ser. No. 11/237,003, entitled Contagion Isolation and Inoculation, filed Sep. 27, 2005, now U.S. Pat. No. 8,234,705.

BACKGROUND OF THE INVENTION

Unwanted and/or malicious network communications, such as spam, phishing, worm propagation, etc., hamper productivity and the use and enjoyment of computer and network resources by end users, burden affected networks with unauthorized and/or undesired traffic, and expose recipients to the risk of theft, fraud, etc. Current technologies for dealing with such unauthorized and/or unwanted communications focus on filtering messages at a point in the communication path close to the recipient system, such as anti-spam and/or other security software installed on the destination host and/or a local mail (or other messaging) server to which communications to the destination host are directed for delivery to the destination host, e.g., by detecting messages sent by blacklisted senders and/or messages containing header or other content that indicates the message is suspicious. While this approach can be an effective way to protect an individual host or a group of destination hosts served by a local server, it does not address the network congestion problem and leaves vulnerable hosts not protected by destination (or destination mail or messaging server) based filtering software. In addition, in many cases an attacker causes each of one or more compromised hosts to send multiple instances of a malicious communication, often simultaneously or nearly so, magnifying the effect on the network. Therefore, there is a need for an effective way to intercept and take corrective action with respect to unauthorized, unwanted, and/or otherwise malicious electronic mail and/or other network communications that better protects the network and provides protection to destination hosts that are not protected by destination or destination mail or messaging server based filtering software.

BRIEF DESCRIPTION OF THE DRAWINGS

Various embodiments of the invention are disclosed in the following detailed description and the accompanying drawings.

DETAILED DESCRIPTION

Figure 1:
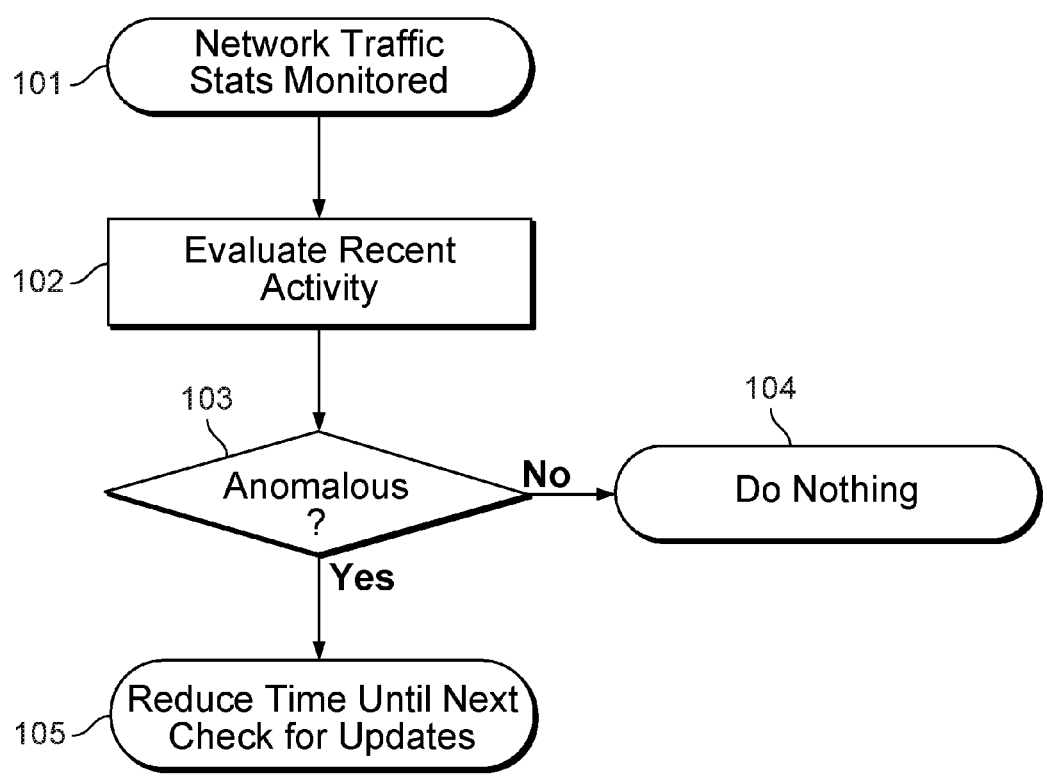
FIG. 1 is a flow diagram of a method for reducing an anti-contagion update interval during periods of suspicious network activity according to some embodiments.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time and a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analyzing routing information to identify and intercept unauthorized, unwanted, and/or otherwise malicious communications is disclosed. In some embodiments, routing information associated with a message currently being processed is checked against corresponding information associated with a message from the same source that was processed previously. In some embodiments, a message processing system that handled and/or otherwise has access to routing information for both messages performs the check, such as a network messaging and/or access service provider with which the sender is associated, performs the check. If the routing information for the current message does not match the corresponding information observed in the previous message, responsive action is taken.

Contagion refers herein to software programs and/or code, data values, configurations, and settings, that expose a computer or other system to security threats, such as unauthorized access and/or use of the system and/or data stored thereon; corruption or loss of data; and/or damage, loss, and/or unauthorized reconfiguration of system software and/or hardware components. Examples of contagion include software programs and/or code designed to perform undesirable and/or unauthorized actions from the perspective of the (authorized) user of a computer, and at the same time perform desired actions from the perspective of the creator or controller of such contagion. Examples of contagion include computer worms, viruses, and Trojan horses. Anti-contagion software refers herein to software that prevents, impedes or remediates contagion, such as Norton Antivirus from Symantec, or VirusScan from McAfee, which identifies and/or removes contagion from a user's computer. Another example of anti-contagion software is software that repairs a security vulnerability through which contagion may spread. Many anti-contagion methods rely on contagion descriptions, such as virus signatures, to identify the contagion, and must be updated regularly to be effective.

FIG. 1 is a flow diagram of a method for reducing an anti-contagion update interval during periods of suspicious network activity according to some embodiments. An update interval refers herein to a period of time between acquisition of updates, such as security updates, virus signature file updates, or virus scanner updates. In this example, network traffic statistics may be monitored (101). An example of traffic statistics is latency experienced by email, such as average latency, or median latency. Another example of traffic statistics is the rate of unacceptable attempted TCP/IP traffic, such as attempts to connect to blocked or restricted ports, or insufficiently authenticated (or authorized) connections to ports, or connections that provided invalid or illegal content such as extraordinarily long strings, or specific content detected to be malicious. Recent activity may be evaluated (102) to see if it is anomalous. Examples of anomalous activity include median email latency in mail queues beyond some threshold, for example above a 4 hour median queuing delay, and rates of unacceptable attempted TCP/IP traffic beyond some threshold, for example greater than two attempts per minutes over a one hour period. Another example of a threshold for anomalous activity is a comparison with recent historical statistics, such as unacceptable attempted TCP/IP traffic at a rate greater than ten times the expected rate over a 30 minute period. The expected rate may for example be an average over a recent historic period, such as an average rate over the last week of connectivity. If activity is not deemed anomalous (103), then in this example, processing continues with no change (104) in the next update interval. If the activity is deemed anomalous (103), then in this example, the next update interval is reduced, for example reduced to some proportion of the planned update interval, for example reduced to 25% of the previous or default update interval. Another example of reducing the next update interval is to reduce the currently remaining time until an update, for example reducing by a proportion, such as 50%, the remaining time until an update is requested.

Figure 2A:
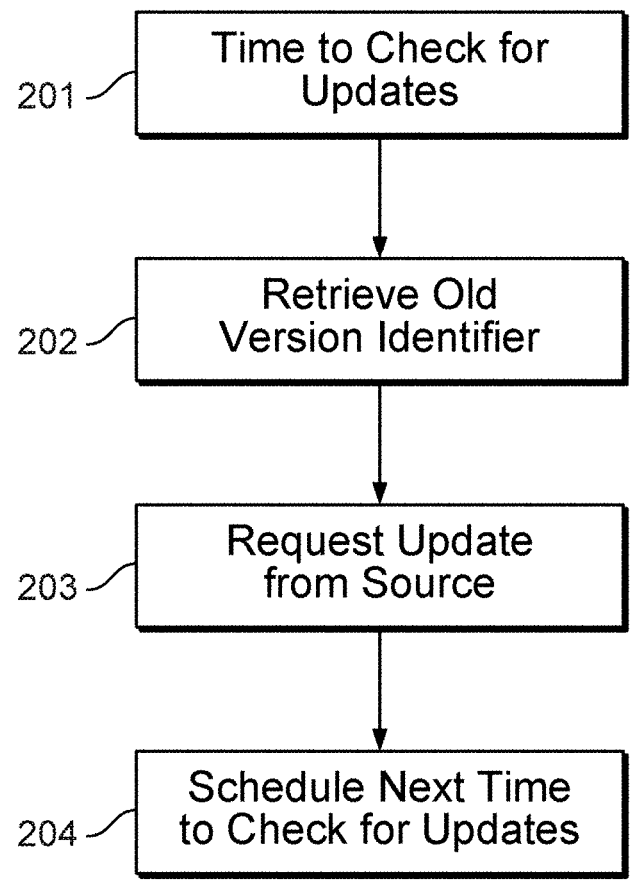
FIG. 2A is a flow diagram of a method for cooperatively scheduling an anti-contagion update interval according to some embodiments.

FIG. 2A is a flow diagram of a method for cooperatively scheduling an anti-contagion update interval according to some embodiments. In this example, the planned time for contacting an anti-contagion source may arrive (201). An old version identifier may be retrieved (202), such as a checksum or hash for a file, or a version number for software stored in a file system or registry, or a version number for an antivirus signature file stored in a file system or registry. An update may be requested from an anti-contagion source (203), for example as is discussed in conjunction with FIG. 3A, which may include updating or concluding that an update is not needed. A time for next contacting an anti-contagion source is decided upon (204). In some embodiments, the scheduled time may be made sooner when the source of the update, such as a vendor of software to which the update pertains, anticipates the impending release of a fully tested update, such as scheduling a next contact time in a few hours, or a few days. If the current computer's version of anti-contagion software contains resolutions to all known problems and otherwise anomalous traffic patterns then, in this example, the update interval may be made longer, such as the full default interval for a computer, for example one week. In some embodiments, the selection of the next update interval may be dependent on the specific product. For example, a "pro version" may have a short default interval, such as one day, and a "home version" may have a relatively long default interval, such as two weeks or one month.

Figure 2B:
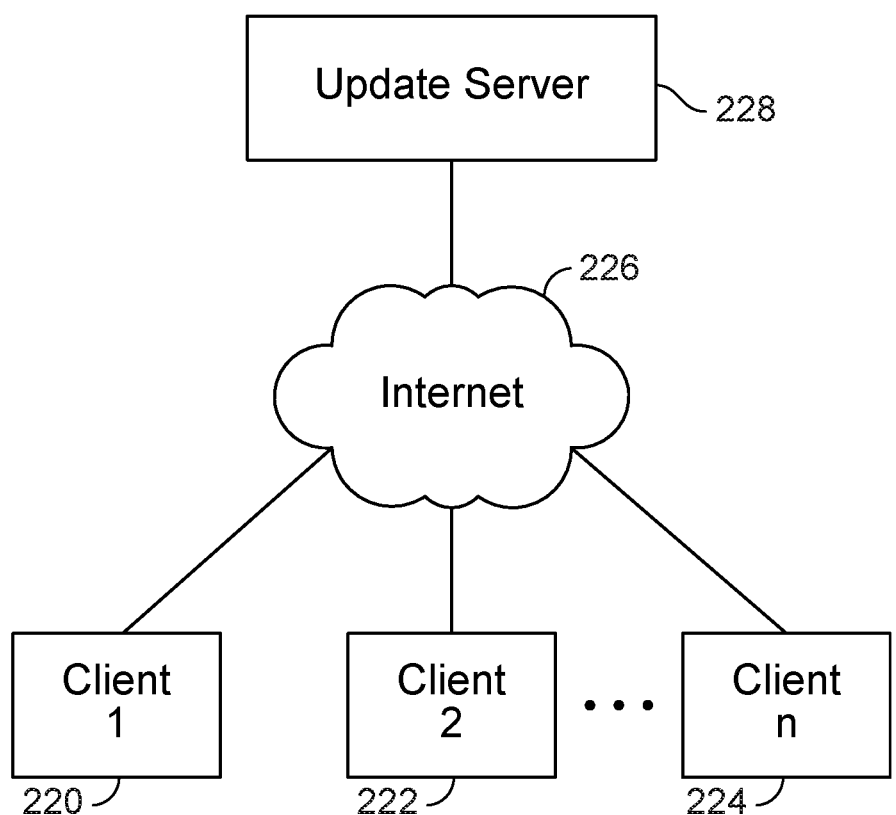
FIG. 2B is a block diagram of a network environment in which anti-contagion updates are distributed according to some embodiments.

FIG. 2B is a block diagram of a network environment in which anti-contagion updates are distributed according to some embodiments. A plurality of clients 1 to "n", represented in FIG. 2B by clients 220, 222, and 224, are connected to the Internet 226. An update server 228 also is connected to the Internet 226. In various embodiments, one or more of the clients 220-224 is configured to request and obtain updates, if any, from update server 228 via the Internet, e.g., as described above in connection with FIG. 2A.

Figure 3A:
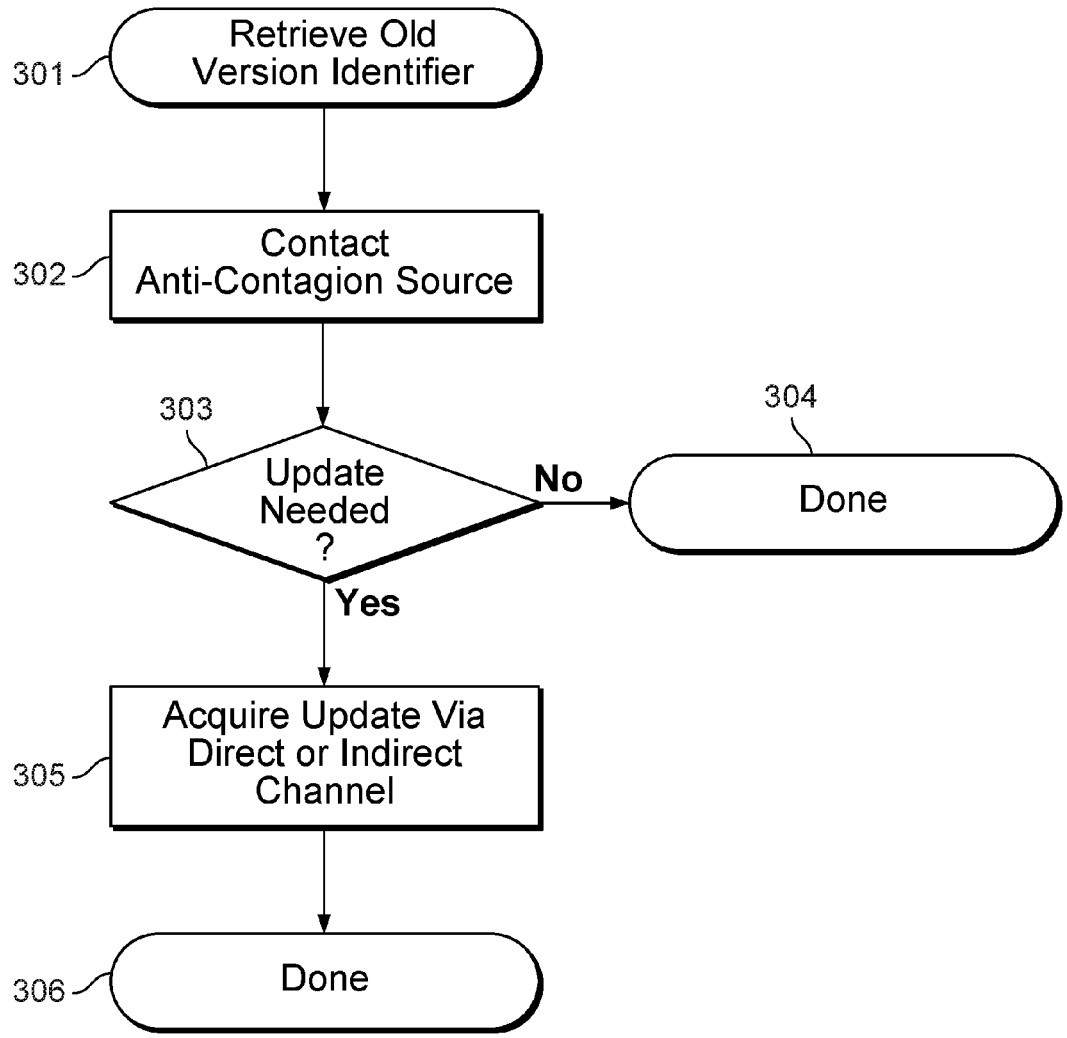
FIG. 3A is a flow diagram of a method for contacting an anti-contagion source and optionally getting an update according to some embodiments.

FIG. 3A is a flow diagram of a method for contacting an anti-contagion source and optionally getting an update according to some embodiments. In this example, an old version identifier may be retrieved (301), for example as was discussed in 202 of FIG. 2A. Contact may be made with an anti-contagion source (302) via a network such as the Internet. The old version identifier may be provided, for example using a transport protocol such as TCP/IP, and a data encapsulation format such as XML, or using a higher level protocol and format such as SOAP. A decision may be made as to whether an update is needed (303). In some embodiments, this update decision may be made by a server, upon review of the old version identifier. In some embodiments, this update decision may be made by the user's computer. In some embodiments, the update decision may be made by incorporating preferences held on a user's computer, such as a preference to always have the newest updates, or preferences to avoid updates that have been available for less than a threshold length of time (for example, 2 weeks), or preferences that accept an additional update when the source indicates urgency associated with the update. In some embodiments, the update decision may be made based on considerations such as the size of the potential update, for example by avoiding the overhead of small updates, and only performing an update when a threshold amount of change has taken place, or when a threshold length of time has elapsed since an actual update was made. An example of a threshold amount of change taking place is the addition of a prescribed number of viral signatures, such as 2 new signatures. An example of a threshold length of time is 3 weeks. If the update is not needed (303) then the process of contacting the source is complete (304) in this example. If an update is needed (303) then an update is acquired in this example via direct or indirect channels (305), for example as further described in conjunction with FIG. 4A. After the update has been acquired (305), the contact may be complete (306).

Figure 3B:
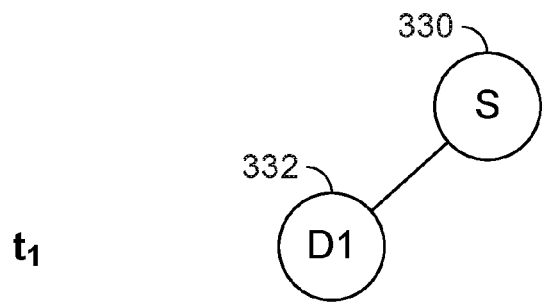
FIGS. 3B-3D illustrate distributed update distribution as implemented according to some embodiments.
Figure 3C:
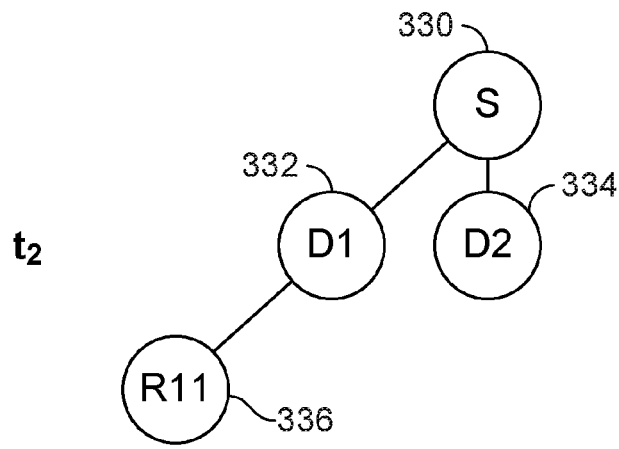
Figure 3D:
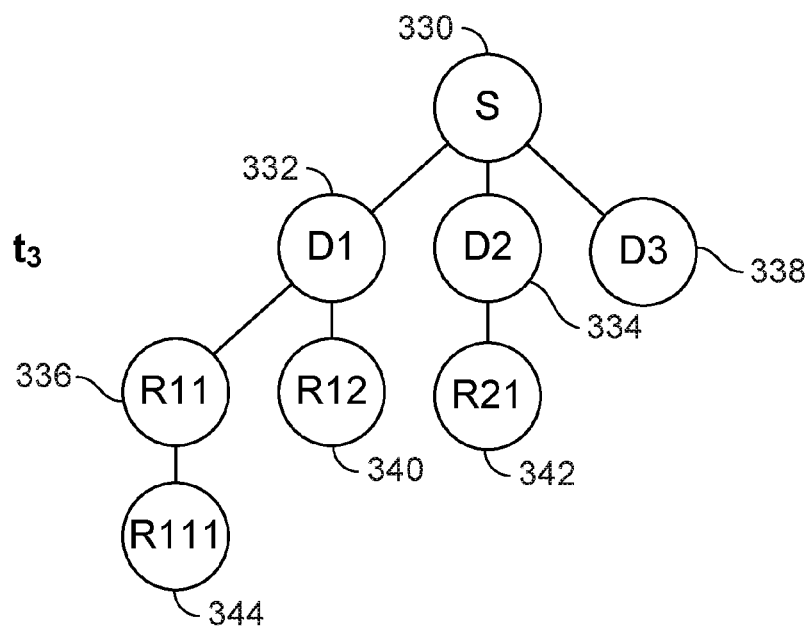

Distributed update distribution is disclosed. In some embodiments, at least some users receive an update indirectly, e.g., from another user that received it previously, either directly from the original source or indirectly from a source that had itself earlier received it, again either directly or indirectly, and so on. FIGS. 3B-3D illustrate distributed update distribution as implemented according to some embodiments. In the example shown in FIGS. 3B-3D, it is assumed for expository purposes that each host that receives the update will serve as a redistribution node, each recipient has the ability to redistribute at the same rate as the original source, and there is continuous demand for the update from all sources. As shown in FIG. 3B, at a time t1 a first direct recipient of the update D1 (332) downloads the update from the original source S1 (330). As shown in FIG. 3C, at a time t2 a second direct recipient D2 (334) downloads the update from the original source and an indirect recipient R11 (336) downloads the update from the first direct recipient D1 (332), which in this case acts as a redistribution node. As shown in FIG. 3D, at a time t3 a third direct recipient D3 (338) downloads the update from original source S (330), a second indirect recipient R12 (340) downloads the update from the first direct recipient D1 (332), a third indirect recipient R21 (342) downloads the update from the second direct recipient D2, and a fourth indirect recipient R111 (344) downloads the update from first indirect recipient R11 (336). In this example, in the three download cycles shown in FIGS. 3B-3D on its own the original source would only have been able to download the update to the three direct recipients, but by using previous recipients to redistribute, in the example shown in FIGS. 3B-3D a total of seven recipients have been able to obtain the update. In a generalized case, under the assumptions used in this example in "n" download cycles/periods a total of $2^n-1$ recipients are able to obtain the update, whereas only "n" recipients, i.e., one per cycle, would otherwise have been able to obtain the update if it were only available directly from the original source. In an even more generalized case, under an assumption that each server may download roughly k copies in a time interval, for example where more than one download is provided by a server at a time, then in "n" download cycles (or periods) a total of roughly $(k+1)^n-1$ recipients are able to obtain the update, where as only k*n recipients, i.e., k per cycle, would otherwise have been able to obtain the update if it were only available directly from the original source.

Figure 4A:
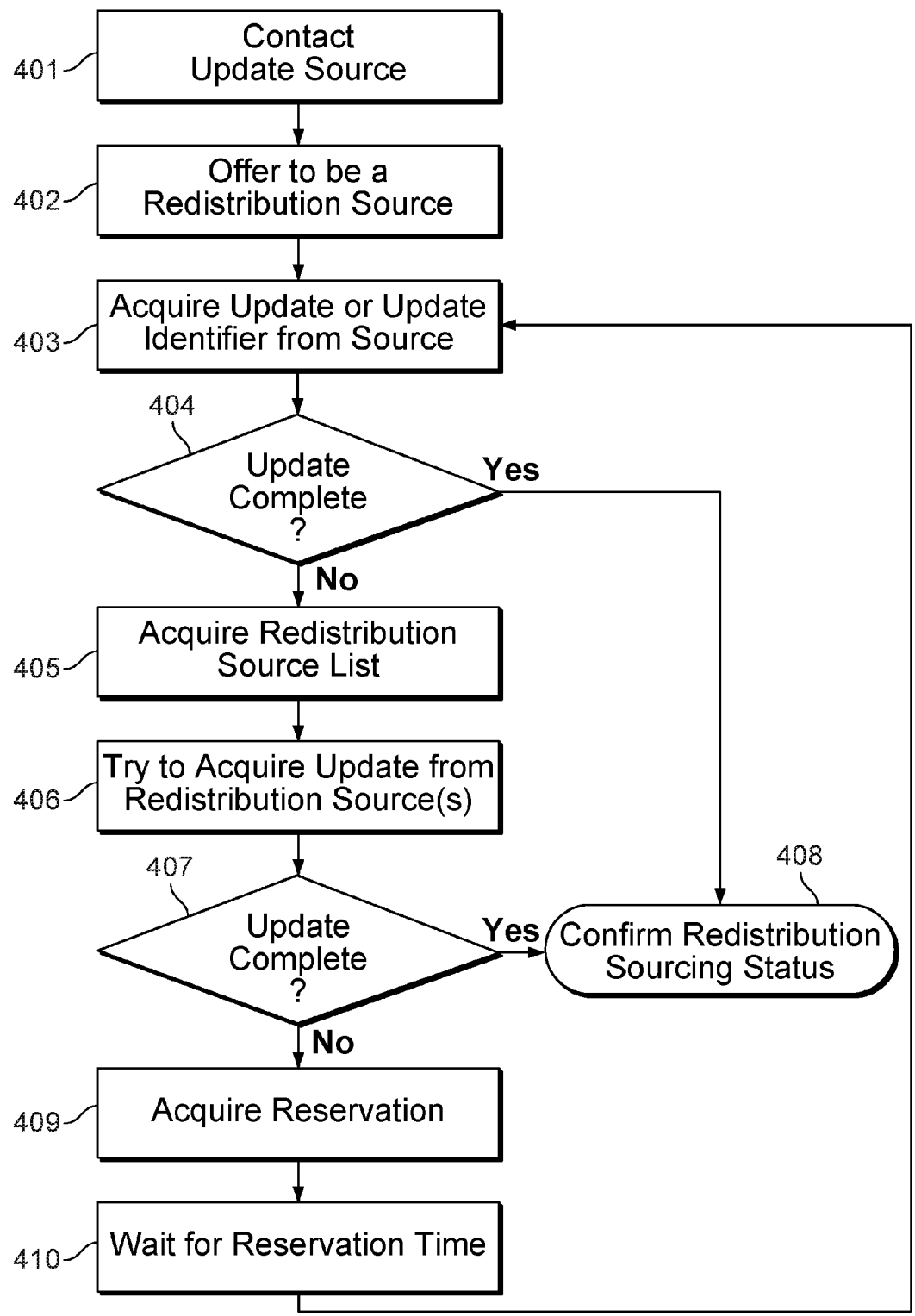
FIG. 4A is a flow diagram of a method for acquiring an update according to some embodiments.

FIG. 4A is a flow diagram of a method for acquiring an update according to some embodiments. In this example, an update source is contacted (401), such as via an Internet connection, for example via TCP/IP. An offer to serve as a redistribution source is made (402). In some embodiments, a redistribution source may be contacted by other computers to acquire an update. An example of an offer to be a redistribution server is described in conjunction with FIG. 6. In various embodiments, 402 is optional, performed only if a criterion or test is satisfied, or omitted. An update or an update identifier is acquired (403). An example of an update identifier is a version number for an update. Another example of an update identifier is a checksum for an update. Another example of an update identifier is a set of checksums (such as MD5, SHA-1, or CRC-32) for a corresponding set of byte ranges that form the update. Another example of an update identifier is a combination two or more identifiers, such as the identifiers enumerated above. If the update was completed (404) then the user confirms redistribution sourcing status (408) in this example. In some embodiments, confirmation includes asserting that the client is prepared to redistribute copies of the received data to one or more recipients. If the update was not completed (404), then a list of peer or other sources is acquired (405) in this example. In some embodiments, the list is or may be explicit. In some embodiments, the list is or may be implicit, for example represented by an iterator or accessor, which may retrieve elements on an as needed basis. In some embodiments, implicit lists are dynamic, and calculated or created in part on an as needed or as requested basis. In some embodiments, the list of other sources contain addresses that may be contacted to acquire an update, such as a list of IP addresses and ports, as well as optionally some authentication information to be used when contacting a listed source. In some embodiments, a requesting host that agrees to serve as a redistribution source is provided with a list of sources from which the update is available immediately, or at least sooner than it will be made available to hosts that will not redistribute. One or more attempts may be made to acquire the update from a listed source (406), for example as exemplified in FIG. 8. If the update is completed via a listed source (407), then redistribution status is confirmed (408) in this example. If the update is not complete (407) then a reservation is optionally negotiated and/or acquired (409) in this example. In some embodiments, a reservation may include a time and/or a specific source or IP address. In some embodiments, a reservation address may be selected from a collection of source addresses, for example in order to distribute the load across more than one server, or to provide a server that is closer to a recipient. An example of selecting a server close to a recipient is to select a server having relatively lower latency during a download, or relatively lower cost, for example by selecting a source within a recipient's ISP complex or within a recipient's intranet or home network. If a reservation time was acquired, then a wait for that reservation time (410) is performed in this example. At the reservation time, a further attempt to acquire an update or update identifier from the source (403) is made, and the flow proceeds as described earlier. This flow may continue until an acquisition is complete (408), as also described earlier. In various embodiments, one or more of confirming redistribution sourcing status (408), attempting to obtain the update from a redistribution source (405-407), and/or acquiring and/or waiting for a reservation time (409-410) is/are optional, conditional, or omitted.

Figure 4B:
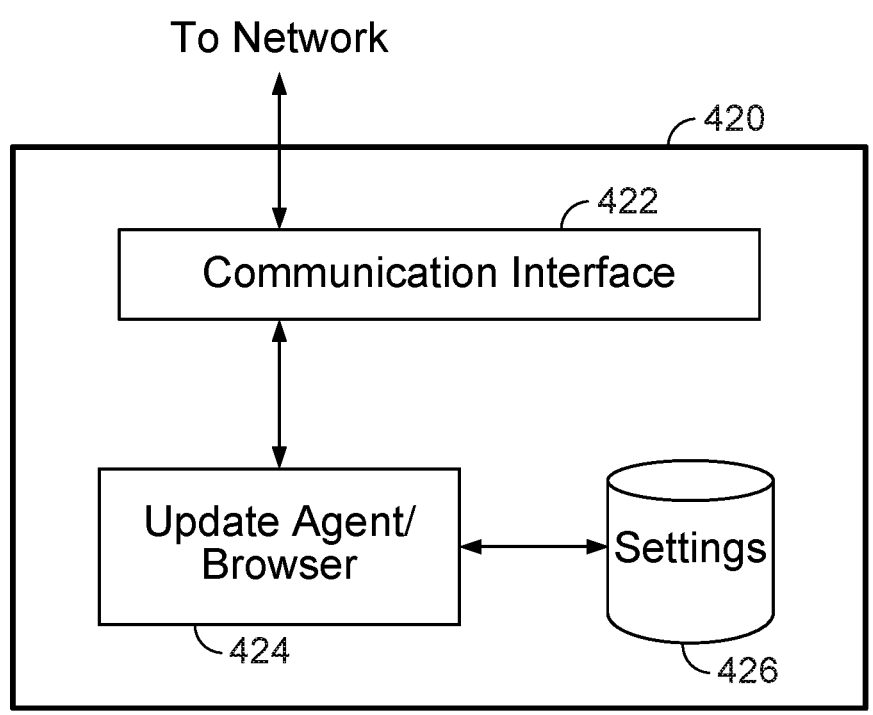
FIG. 4B is a block diagram of a client system configured to obtain an update according to some embodiments.

FIG. 4B is a block diagram of a client system configured to obtain an update according to some embodiments. In some embodiments, the client system shown in FIG. 4B is used to implement one or more of clients 220-224 of FIG. 2B. The client system 420 includes a communication interface 422, such as a network interface card, configured to send/receive communications via a network, such as the Internet. The client system 420 further includes an update agent and/or browser 424. In some embodiments, the update agent/browser 424 comprises browser software used to navigate the World Wide Web, e.g., to send/receive data to/from a website from which an update is available for download. In some embodiments, update agent/browser 424 includes an agent associated with anti-contagion software installed on the client system 420. In various embodiments, the update agent/browser 424 comprises one or more components and is implemented as one or more software programs running on a processor and/or one or more hardware components. A settings data store 426 stores one or more settings and/or other data associated with the software with which an update and/or software to which the update does or may pertain, such as periodicity or next scheduled (e.g., reservation) time to check for updates, a list of update identifiers, locators, and/or redistribution sources from which an update is or may be available, policies for whether and/or under what terms, conditions, circumstances, etc. the client system 420 may be used redistribute an update, a last update time, an old version identifier (see, e.g., 202 of FIG. 2A), etc.

Figure 4C:
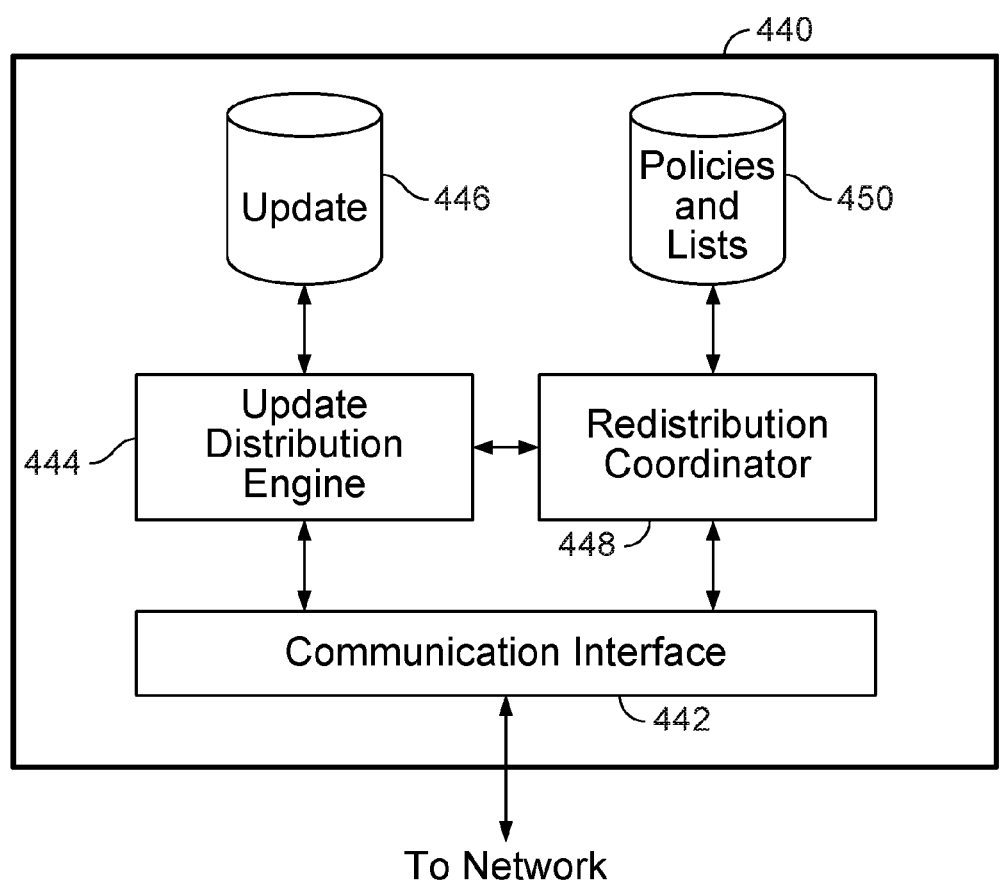
FIG. 4C is a block diagram of a system used to distribute an update according to some embodiments.

FIG. 4C is a block diagram of a system used to distribute an update according to some embodiments. In some embodiments, the system of FIG. 4C is used to provide an update server, such as update server 228 of FIG. 2B. In this example, the distribution system 440 includes a communication interface 442 configured to send/receive data via a network, such as the Internet. An update distribution engine 444 is configured to receive and service requests for updates. For updates provided directly to a request source, the update distribution engine 444 obtains the update from an update storage location 446 and provides the update to the request source via the communication interface 442. In some embodiments, if data included in the request indicates the source of the request is or may be willing to serve as a redistribution source, the update distribution engine 444 hands the request off to a redistribution coordinator 448, which negotiates with the request source, e.g., based on policies, settings, rules, etc. stored in a policies and lists data store 450, through communications sent/received via communication interface 442, to determine if the requesting source will serve as a redistribution source and, if so, to determine the terms and conditions of such service and data, such as an address, locator, or identifier, that can be provided to other requesting systems and/or users to enable them to attempt to obtain the update from the redistribution source. In some embodiments, if update distribution engine 444 determines that it is not able to provide the update to the request source directly (e.g., due to capacity limits or because a policy applicable to the request and/or the request source indicates the request source should be directed to a redistribution source, e.g., because the request source has a less expensive version of the software or is not willing to serve as a redistribution source), the update distribution engine 444 hands the request off to redistribution coordinator 448, which provides to the request source an update identifier and a list of one or more redistribution sources from which the update is or may be available to the request source.

Figure 5:
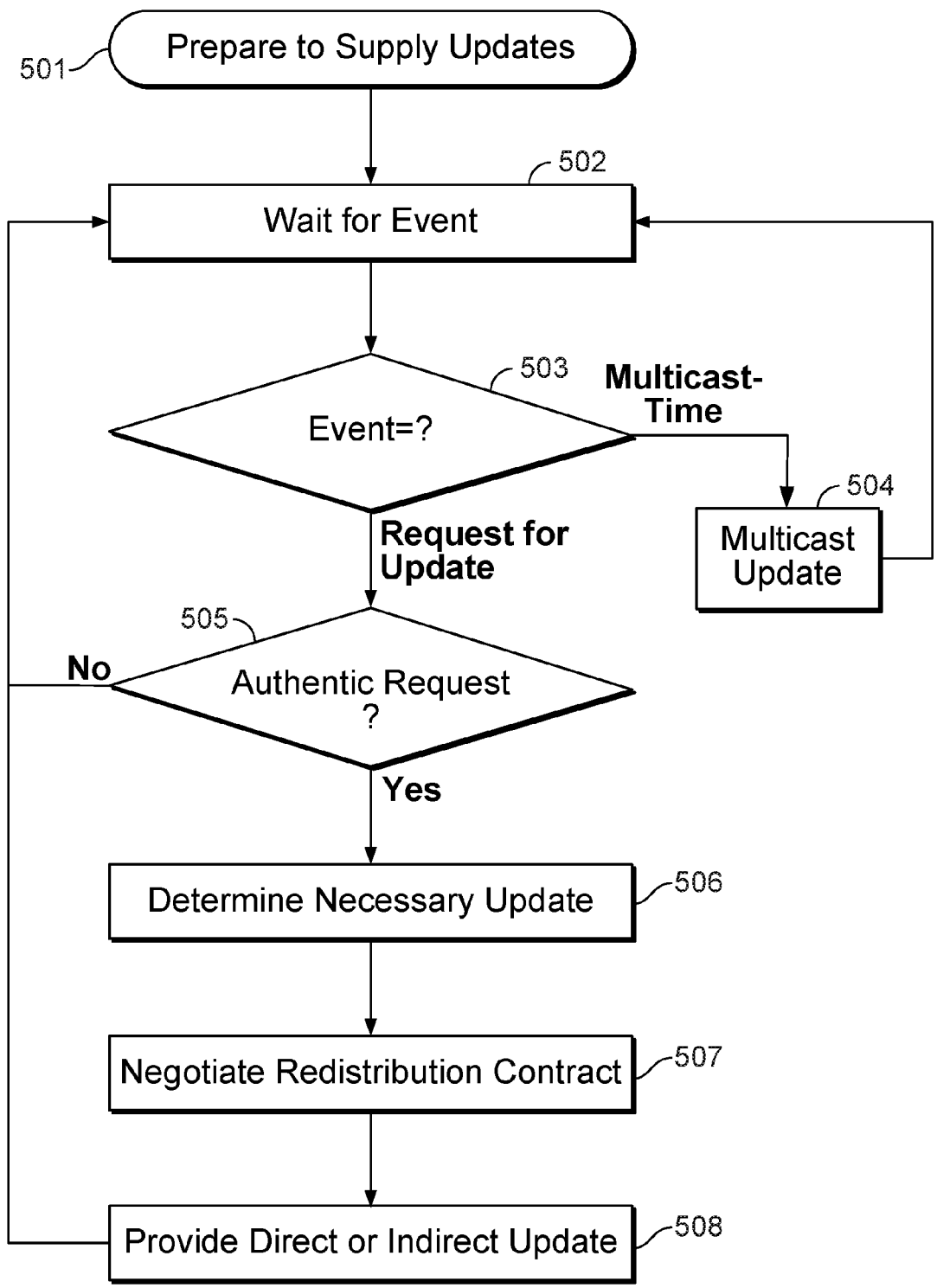
FIG. 5 is a flow diagram of a method for distributing updates according to some embodiments.

FIG. 5 is a flow diagram of a method for distributing updates according to some embodiments. In this example, a source prepares to supply updates to recipients (501), for example by starting up a server, for example an HTTP or FTP server, or a multicast server, such as an RTP multicast server. The server waits for an event (502), such as a contact on a predefined port, or a notification that the server should start a multicast. If a multicast-time event appears (503) then an update is multicast (504) in this example. In some embodiments, a multicast time event may be generated internally or externally to the server to start a multicast. In some embodiments, a multicast-time event may be automatically generated at predetermined times, such as hourly, weekly, or daily, or on individually specified dates and times. In some embodiments, a multicast-time event may include a specific identifier for the multicast. If an event of the form of an update request arrives (503) then a test for authenticity is optionally performed (505) in this example. An example of determining whether a request is authentic is to check a credential. Examples of credentials include a provided shared secret, such as a secret used by all requestors to this server, or a different secret used by each requestor such as a user serial number, or a cryptographically signed authentication, such as credentials or a certificate issued to users that had paid for an update service, for example, by inclusion in a purchased software package. In some embodiments, all requests are assumed to be authentic without the use of any authenticator. If the request was not authentic (505) then, in this example, the server continues to wait for an event (502). If the request was authentic (505) then the server may determine a necessary update (506) in this example. In some embodiments, determination of an update may be made based on the requestor's state, which in some embodiments may be indicated in a received request for update. A redistribution contract may be negotiated (507). In some embodiments, some requestors may agree to redistribute updates to other requestors. In some embodiments, some requestors may decline to redistribute updates. In some embodiments, a source may decline redistribution proposals from a requestor. An example of a redistribution contract is an agreement not to redistribute. Another example of a redistribution contract is an agreement to redistribute a fixed number of copies, such as five copies. Another example of a redistribution contract is an agreement to redistribute for a fixed period of time, such as one day. Another example of a redistribution contract is an agreement to redistribute within a specified geographic region within a fixed period of time. Another example of a redistribution contract is an agreement to redistribute indefinitely, for example until a replacement update is provided. A redistribution contract may be made with terms that are combinations of the above mentioned exemplary term limitations. An update may be provided directly or indirectly (508). A direct update may for example be provided by allowing an FTP download, or by encapsulating the transmission in an HTTP transfer, for example using XML and/or an appropriate coding, such as uuencode. An indirect update may be provided by directing the requestor to an alternate source, such as a redistribution server, or a server at a different address, or a server at a different time, such as a future time, or a combination of two or more such specifications. In some embodiments, a decision to provide direct vs. indirect updates may be based in part on the redistribution contract, for example a requestor that is willing to redistribute may be updated sooner or more directly. An example of a redistribution contract is a promise by a user to provide redistribution in exchange for purchase price concession, such as a reduced initial purchase price, or a quantity discount price. In some embodiments, a decision to provide direct vs. indirect updates may be based in part on previous agreements, such as prepayment for expedited service, such as may be included in a more expensive version of a product that utilizes the updates. The server may wait for an event (502). In some embodiments, events may be processed in parallel with previous events, or may be sequentially processed, or some combination, for example up to a threshold number of events in parallel, such as a maximum of 32 events in parallel.

Figure 6:
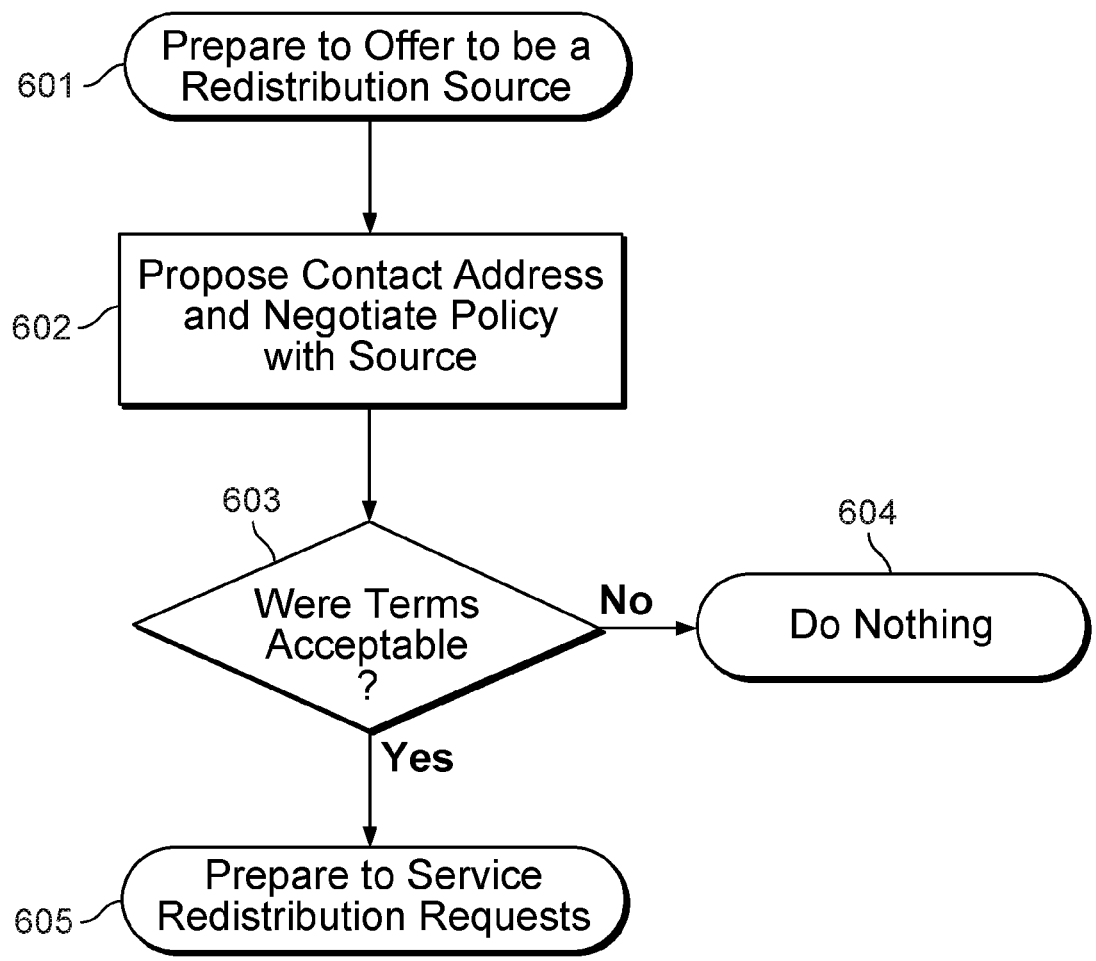
FIG. 6 is a flow diagram of a method for establishing a redistribution policy according to some embodiments.

FIG. 6 is a flow diagram of a method for establishing a redistribution policy according to some embodiments. In this example, a computer may prepare to offer to be a redistribution source (601). In some embodiments, preparations may include retrieving preferences, such as the number of redistributions that may be done, or the duration of time that the computer is willing to act as a redistribution source. In some embodiments, preferences may be defaults, or may be configured by a user and stored persistently, such as in a registry or file system. A contact address may be proposed to the source and a policy may be negotiated (602). A contact address may for example be a globally routable IP address and a port, or a local IP address (reachable from a LAN behind a firewall) and port that can be accessed by other computers on the LAN, such as computers that shared a common NAT address in their contact with the original source. In some embodiments, negotiation may include proposing a policy. In some embodiments, negotiations may involve a counter proposal in response to a proposal. An example of a counter proposal criterion is to require a minimum duration for redistribution. If terms were not acceptable (603) then, in this example, the computer does nothing (604). If the terms were acceptable (603) then, in this example, the computer prepares to service redistribution requests (605), for example by establishing a server to respond at the agreed contact address, reserving storage to hold the content for redistribution, etc. In some embodiments, redistribution policy may be a broader contractual matter, where an update is provided more quickly or more directly in exchange for a promise to redistribute. In some embodiments, an auditing mechanism may be used to measure compliance and penalize contract breakers, such as failure to accept connections for redistribution, where penalties may for example include refusal to accept future similar contracts. As another example, a lower purchase or subscription price may be offered for operators of a software product, such as antivirus software, who agree to act as redistribution points. In some embodiments such purchase agreements may be configured into the software, for example by establishing agreements to act as a redistribution point for updates as defaults that a user cannot modify.

Figure 7:
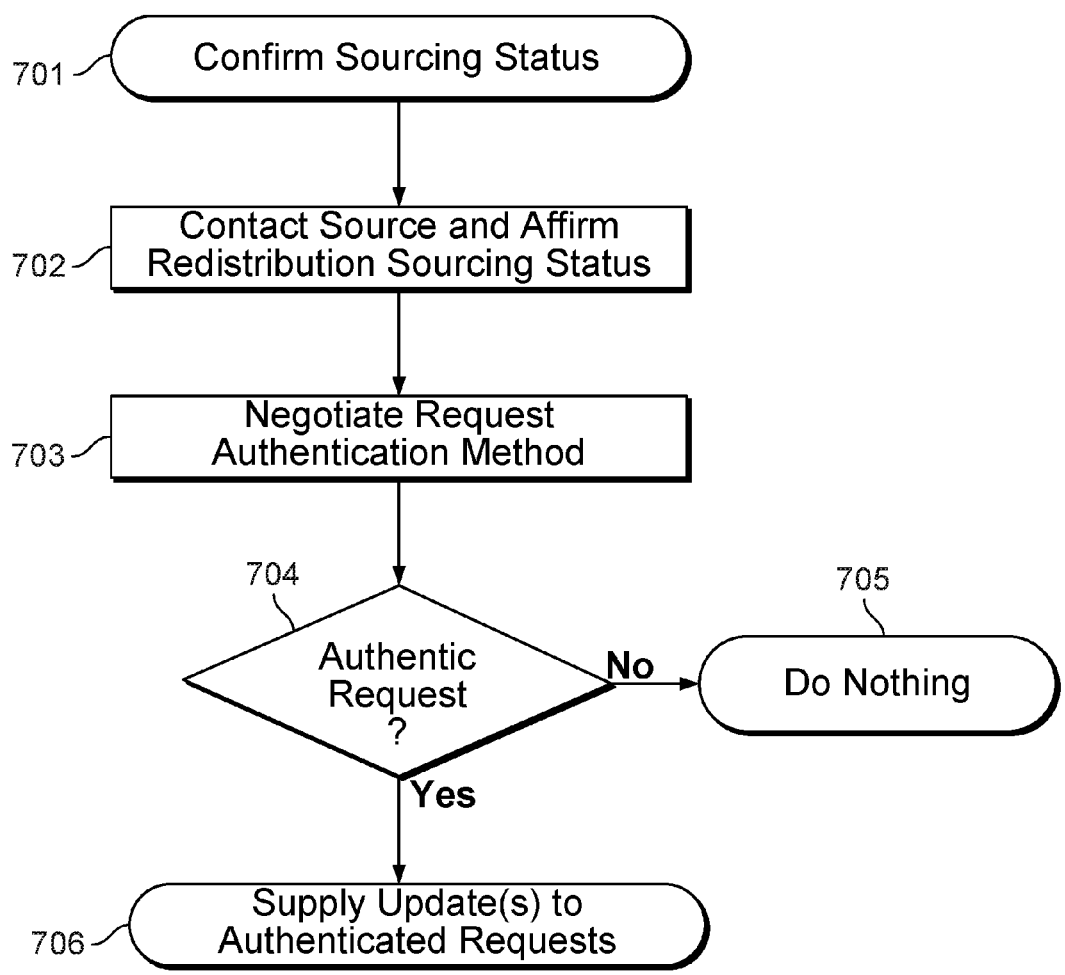
FIG. 7 is a flow diagram of a method for redistributing content such as updates according to some embodiments.

FIG. 7 is a flow diagram of a method for redistributing content such as updates according to some embodiments. In this example, a redistribution computer is contacted and confirms its sourcing status (701), for example by accepting a TCP/IP connection on a predefined port, and processing a request for content. The redistribution computer may optionally contact another computer, for example a more original source, and affirm its redistribution sourcing status (702). A more original source may be a source that has provided content in the past to the redistribution computer, directly or indirectly. In some embodiments, contacting a more original source demonstrates that the redistribution computer is performing redistribution. In some embodiments, contacting a more original source allows the redistribution computer to further authenticate the computer that requested the content, for example by getting confirmation from a more original source that a specific computer was authorized to request the content. An authentication to be used to authenticate requests is negotiated (703). In some embodiments, authentication includes providing a shared secret to the redistribution computer. In some embodiments, authentication includes presenting an authorization cryptographically signed by a more original source, such as a certificate. In some embodiments, all requests are presumed authentic. If the request is not authentic (704), then nothing further is done (705) in this example. If the request is authentic (704), then the requested update is supplied (706) in this example. The updates may be supplied for example via a transport protocol TCP/IP, or a higher level protocol such as FTP, HTTP, or HTTPS, etc.

Figure 8:
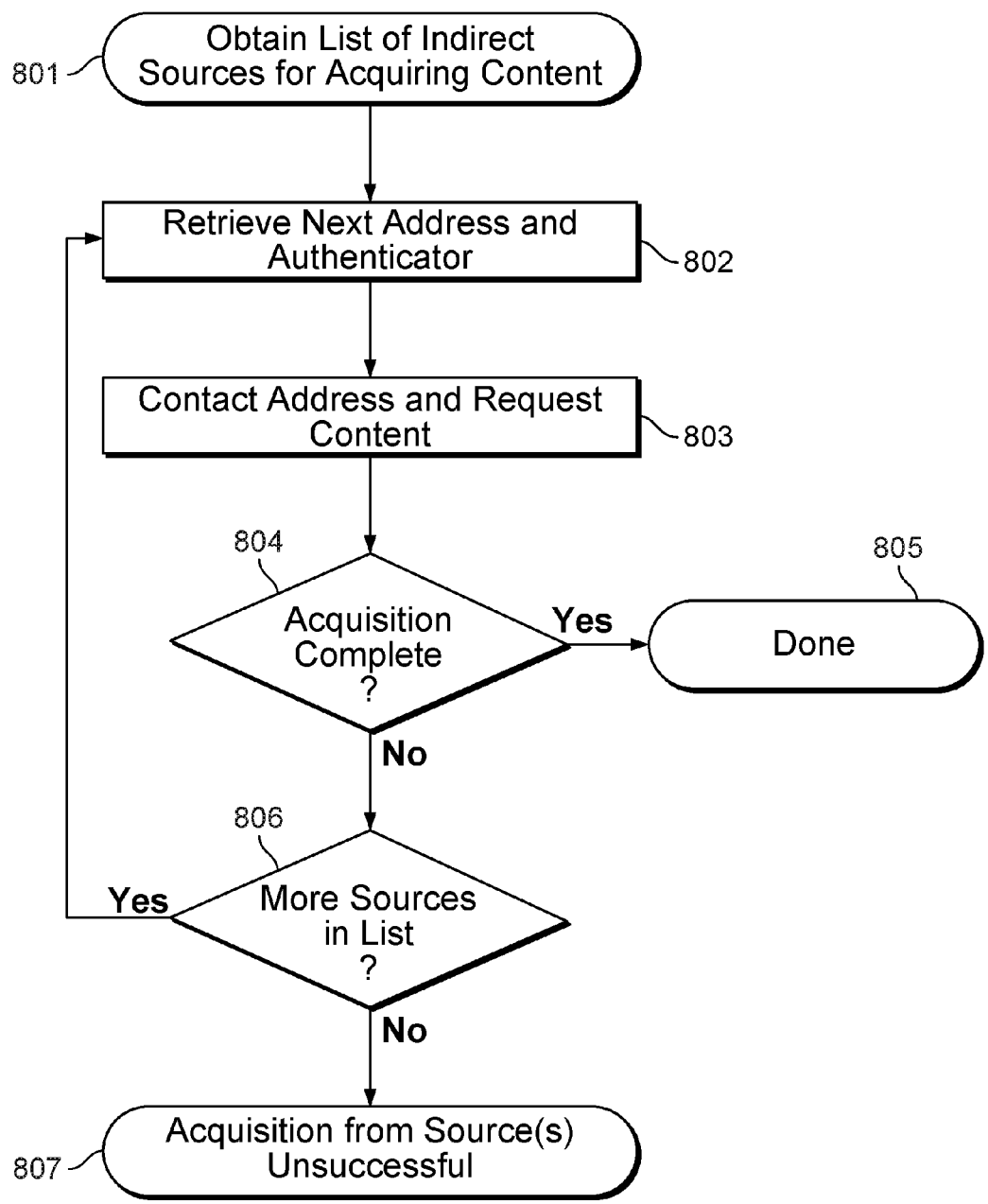
FIG. 8 is a flow diagram of a method for using peers or other indirect data sources to acquire content such as updates according to some embodiments.

FIG. 8 is a flow diagram of a method for using peers or other indirect data sources to acquire content such as updates according to some embodiments. In this example, a list of one or more peers or other indirect sources for acquiring updates is obtained (801), for example as was discussed in conjunction with 405 of FIG. 4A. In one example, an indirect source may be a peer, such as another computer that has downloaded the content. In another example, an indirect source may be a computer configured to redistribute content without other use of the content, such as an ISP server established to redistribute content to subscribers. In another example, an indirect source may be a server created or authorized by the original source to perform additional distributions. In some embodiments, an obtained list of indirect sources may be implicit, for example by referring to a list using an iterator or accessor construct that can itemize entries in the list when requested, for example using a query to a service when an additional item in the list is required, which may for example dynamically complete the list on an as requested basis. A next address and (optional) authenticator in the list of sources is retrieved (802). Any order may be used. In some embodiments, an order of processing may correspond to the original list order. In some embodiments, an order of processing may be such that the earlier processed addresses would be expected to have lower latency and/or higher bandwidth, for example by first processing a local address on a LAN. In some embodiments, elements of the list are or may be processed in parallel, and portions (such as byte ranges) of the content may be acquired from different addresses in the list. An address on the list may be contacted to request content (803), which may in some embodiments be performed as described in conjunction with FIG. 7. In one example, a source address may consist of an identifier for a broadcast with optional time(s) for a broadcast, and contact with the source may include receiving the broadcast. In another example, contact with the source may include making a connection such as a TCP/IP connection with the source. If the acquisition is complete (804), then the processing is complete (805) in this example. If the acquisition was not completed (804) then additional sources in the list are considered in this example. If there are more sources in the list (806) then, in this example, a next source is retrieved along with an optional authenticator (802) and the processing continues. If there are no more sources (806) then the attempted acquisition from source(s) is unsuccessful (807) in this example.

Figure 9:
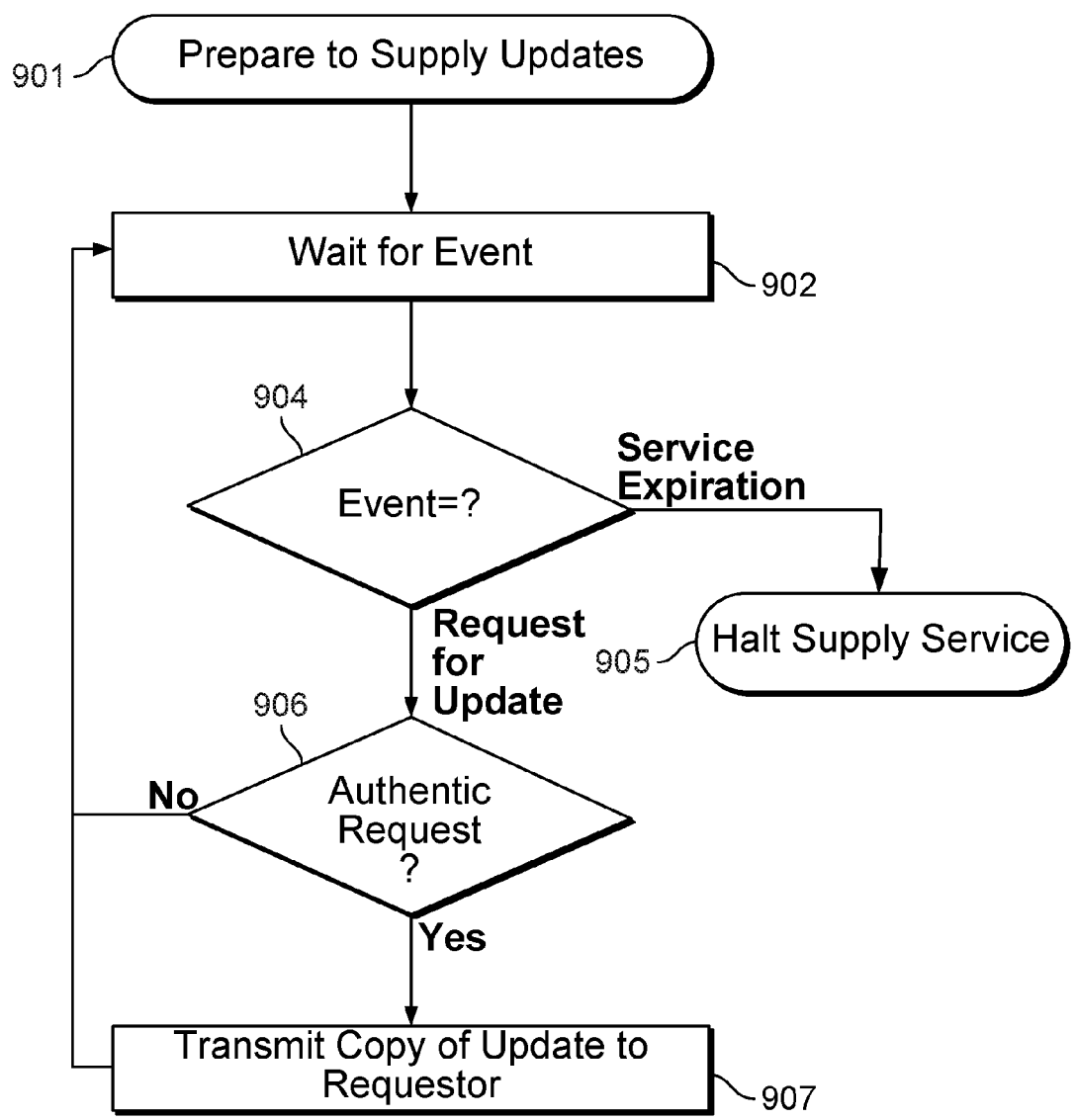
FIG. 9 is a flow diagram of a method for redistributing content such as updates according to some embodiments.

FIG. 9 is a flow diagram of a method for redistributing content such as updates according to some embodiments. In this example, a computer prepares to supply content (or updates) to a requestor/recipient (901), for example by starting up one or more servers. Examples of a server include an HTTP server, an FTP server, and a multicast server. A server waits for an event (902), such as a contact on a predefined port, or a notification that the server should be terminated, or a notification that a time for a multicast has arrived. If a service expiration event appears (904) then the supply service is terminated (905) in this example. A service expiration event may be automatically generated, for example after a predetermined duration of service, or after a predetermined number of copies of an update have been redistributed. If a request event arrives (904), then a test for authenticity is performed (906) in this example. Authenticity may be established in the request, for example by receiving and validating, or performing a mutual proof of possession of, a shared secret, such as a secret used by all requestors to this server, or a different secret used by each requestor of this service and held in a list of single-use secrets by this server, or by providing a cryptographically signed authentication. In some embodiments, all requests are considered authentic without the use of any authenticator. If the request was not authentic (906) then, in this example, the server continues to wait for an event (902) as described earlier. If the request was authentic (906) then, in this example, the server transmits a copy of the content to the requestor (907), for example by allowing an FTP download, or by encapsulating the transmission in an HTTP transfer, for example using XML and/or an appropriate coding, such as uuencode.

Figure 10A:
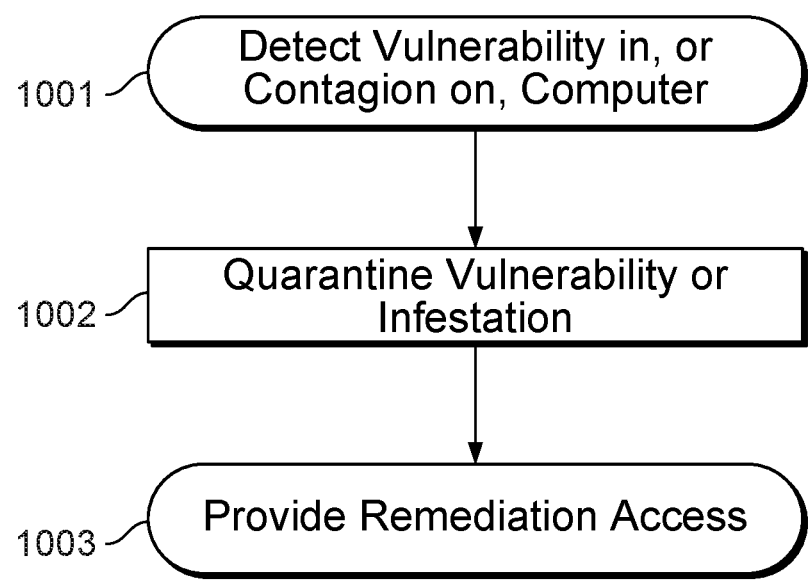
FIG. 10A is a flow diagram of a method for identifying and remedying problems according to some embodiments.
Figure 14:
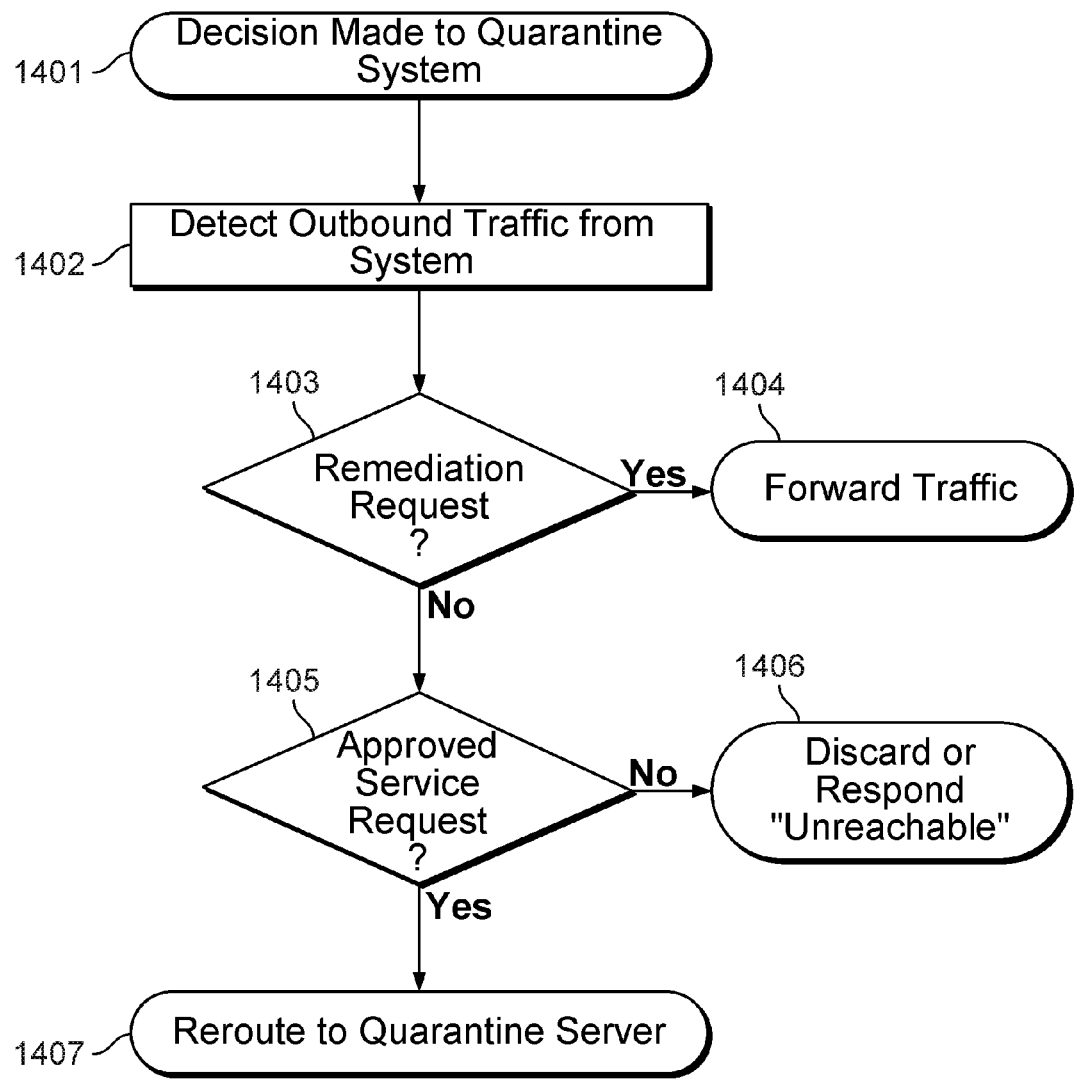
FIG. 14 is a flow diagram of a method for quarantining a computer according to some embodiments.
Figure 15:
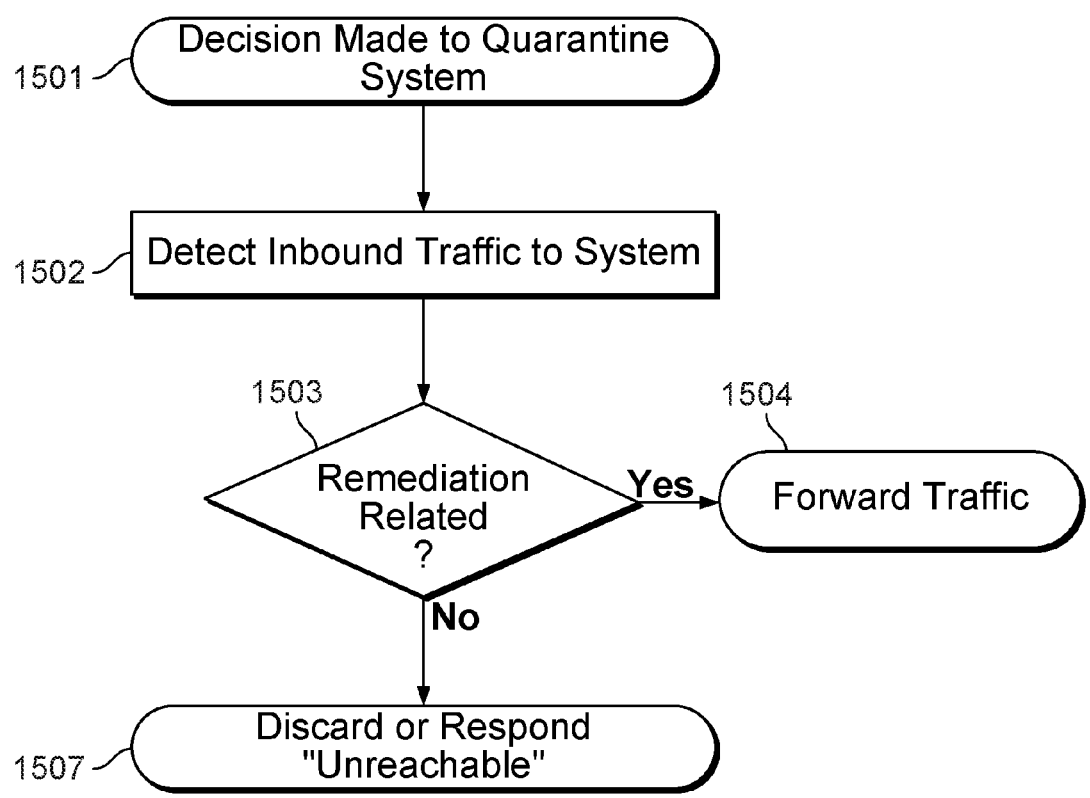
FIG. 15 is a flow diagram of a method for quarantining a computer according to some embodiments.

FIG. 10A is a flow diagram of a method for identifying and remedying problems according to some embodiments. A problem may be identified as some event or status that may cause direct or potential harm. Exemplary problems include vulnerability or infestation. In this example, a problem such as a vulnerability or infestation is detected (1001). Infestation herein refers to the current presence and/or execution of contagion. In some embodiments, detection may be made by a router, firewall, or other network component, separately or in concert, using techniques such as those illustrated by FIGS. 11, 12, and 13. In some embodiments, detection may be made by a computing device, for example a computing device operated by an ISP. After a detection of a problem, a computer or network containing the problem is quarantined (1002). In some embodiments, quarantining includes preventing unauthorized communications from being sent from the quarantined computer, such as efforts to infect, probe, or harass other computers, or efforts to communicate data without authorization, including for example file contents and keyboard entry logs. In some embodiments, no communications are authorized. In some embodiments, quarantining includes preventing undesired communications from reaching the quarantined computer, such as control messages or infectious messages. Examples of quarantining activities are illustrated in FIGS. 14 and 15. In this example, the quarantined computer is provided access to remediation services (1003). In some embodiments, access to remediation includes or may include allowing connections to servers providing security patches or advisories, for example allowing connections to a vendor's server, or providing virus and worm disinfecting tools, such as focused removal tools, or data updates for previously installed repair tools. In some embodiments, access to remediation includes allowing direct access to vendor sites known to provide remediation assistance, such as to Microsoft's Windows Update service, where security patches may be obtained. In some embodiments, access to vendor sites is restricted by the quarantine to certain classes of traffic, such as HTTP requests, certain port access, such as port 80 or port 443, certain content requests, such as specific URLs or specific file downloads. In some embodiments, remediation content may be substituted for other requested content, for example as discussed in conjunction with FIG. 14.

Figure 10B:
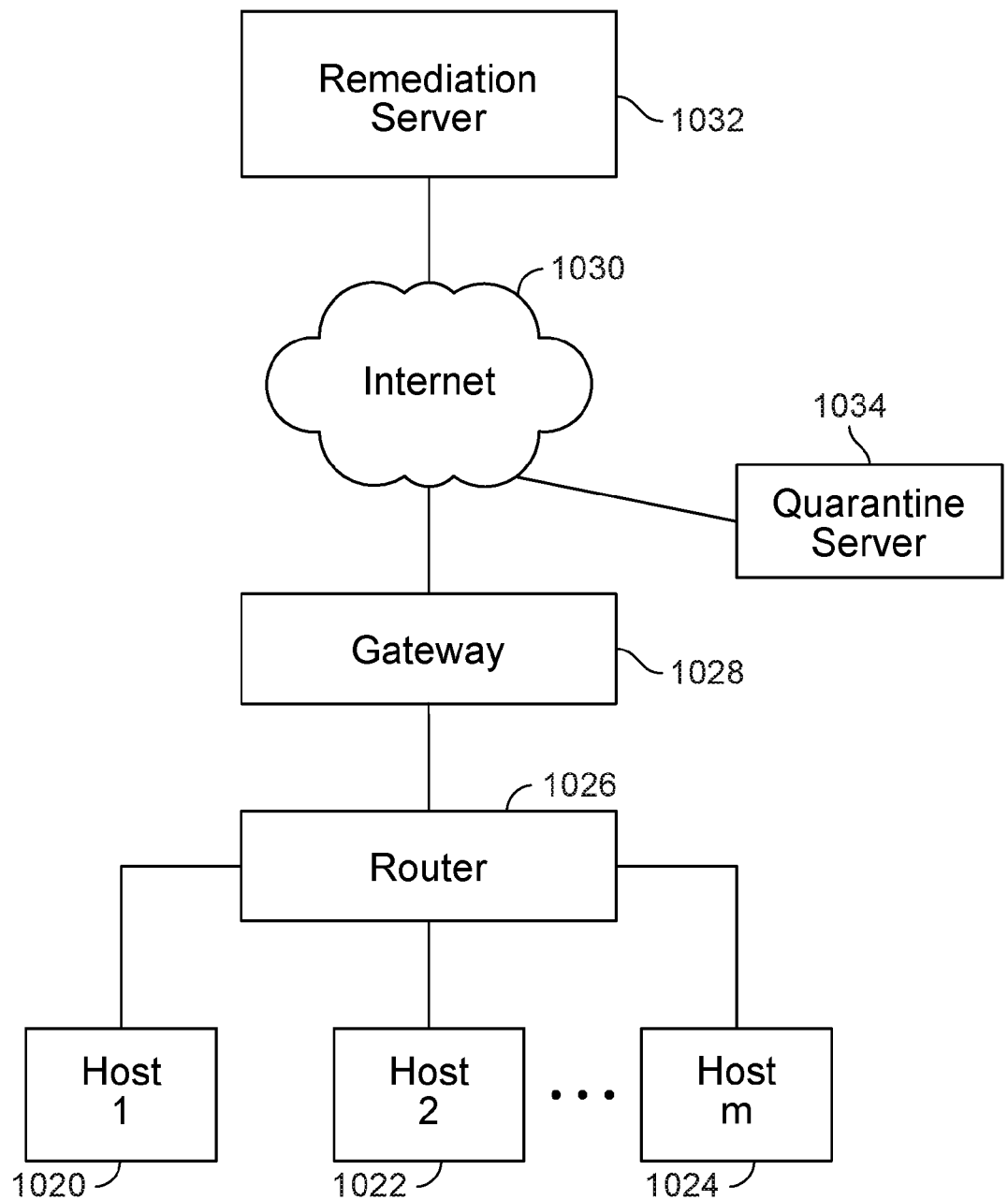
FIG. 10B is a block diagram illustrating a network environment in which infected hosts and/or networks are quarantined according to some embodiments.

FIG. 10B is a block diagram illustrating a network environment in which infected hosts and/or networks are quarantined according to some embodiments. A plurality of hosts 1 to "m", represented in FIG. 10B by hosts 1020, 1022, and 1024, connect via a router 1026 and a gateway 1028 to the Internet 1030. In various embodiments the router 1026 is omitted or included in the gateway 1028. In various embodiments, gateway 1028 comprises a gateway, router, firewall, or other device configured to provide and control access between a protected network and the Internet and/or another public or private network. In various embodiments, the process of FIG. 10A is implemented, in the event of quarantine of one or more of hosts 1020-1024, for example, on the affected (quarantined) host, router 1026, and/or gateway 1028. In some embodiments, a quarantined host (or a host associated with a quarantined network or sub-network) is permitted to access a remediation server 1032, e.g., to download a patch, more current threat definition, etc. In some embodiments, requests to connection to a host other than the remediation server 1032 are redirected to a quarantine server 1034 configured to provide a notice and/or other information and/or instructions to a user of the quarantined host. In various alternative embodiments the quarantine server 1034 is omitted or resides on the router 1026 and/or gateway 1028.

Figure 11:
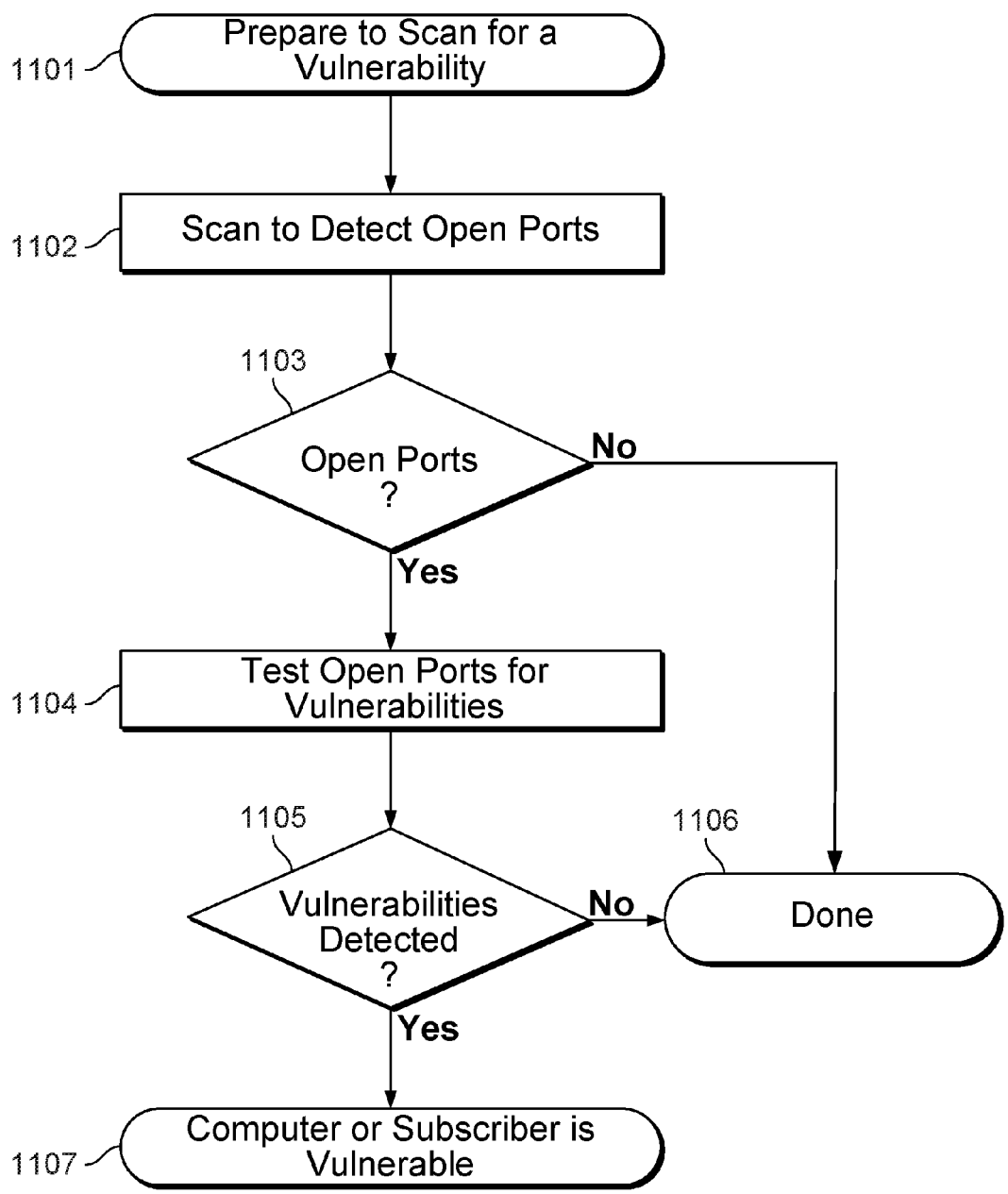
FIG. 11 is a flow diagram of a method for identifying vulnerabilities according to some embodiments.

FIG. 11 is a flow diagram of a method for identifying vulnerabilities according to some embodiments. In this example, preparation is made to scan for one or more vulnerabilities (1101), for example by retrieving one or more IP addresses of computers that need to be scanned. For example, an IP address may be provided by a DHCP sever hosted in an ISP network complex, to identify current subscriber IP addresses. As another example, a subnet range may be scanned, for example by taking an address of the form A.B.C.X, and using some or all values of X in the range 0 to 255 to enumerate distinct IP addresses. A scan of one or more IP addresses may optionally be performed to detect an open port (1102). An example of scanning an IP address is scanning to detect open TCP/IP ports (1102). An open port may be identified by attempting to form a connection, such as a TCP/IP connection to that port. In some embodiments, only open ports on a given computer will provide acknowledgment messages needed to establish a TCP/IP connections, which for example causes a success code to be returned by Unix "connect( )" and a closed port will provide no response to the attempt to connect, which for example would cause an error code to be returned by the Unix function call "connect( )". If no open ports are detected (1103), then the scanning is complete (1106) in this example. If open ports are detected (1103) then those ports are tested for vulnerabilities (1104) in this example. In some embodiments, an open port is assumed (1103) and a test for vulnerability is performed or attempted (1104), for example by communicating a vulnerability test without independently testing to see if one or more requisite ports are open. In some embodiments, a vulnerability test of a port may include sending data that is known to create a discernable response when a vulnerability is present, such as sending a long string known to induce a buffer overflow with a consequent errant response, where the errant response may for example include a characteristic communication, premature termination of the connection, or other erroneous response(s). In some embodiments, a test for a vulnerability is an attempt to exercise a service, such as a sendmail or an RPC service, in search of a misconfiguration of that service that creates a vulnerability. One example of a misconfiguration of a service is provision of any such service. Another example of a misconfigured service is one where a password should be required for security purposes, but no password is required by the misconfiguration. Another example of a misconfiguration is the use of an easily guessable password, such as the default installation password, when resulting access creates a security vulnerability. Another example of a misconfigured service is support for a service provided by an unauthorized agent, such as a worm or virus. If no vulnerabilities are detected (1105) then scanning is complete (1106) in this example. If vulnerabilities are detected (1105) then an associated IP address is flagged as vulnerable (1107) in this example. In the case of a subscriber to an ISP, an IP address may be translated to a particular subscriber identity, for example by checking in DHCP or static IP allocation tables for the subscriber's identity, or for example by extracting a MAC address from traffic associated with the IP address, and such identity may be appropriately flagged or recorded. In some embodiments, the record of the vulnerability may additionally include the port, and the details of the vulnerability that was detected, such as which buffer overrun was vulnerable, or which service was misconfigured to create a vulnerability.

Figure 12:
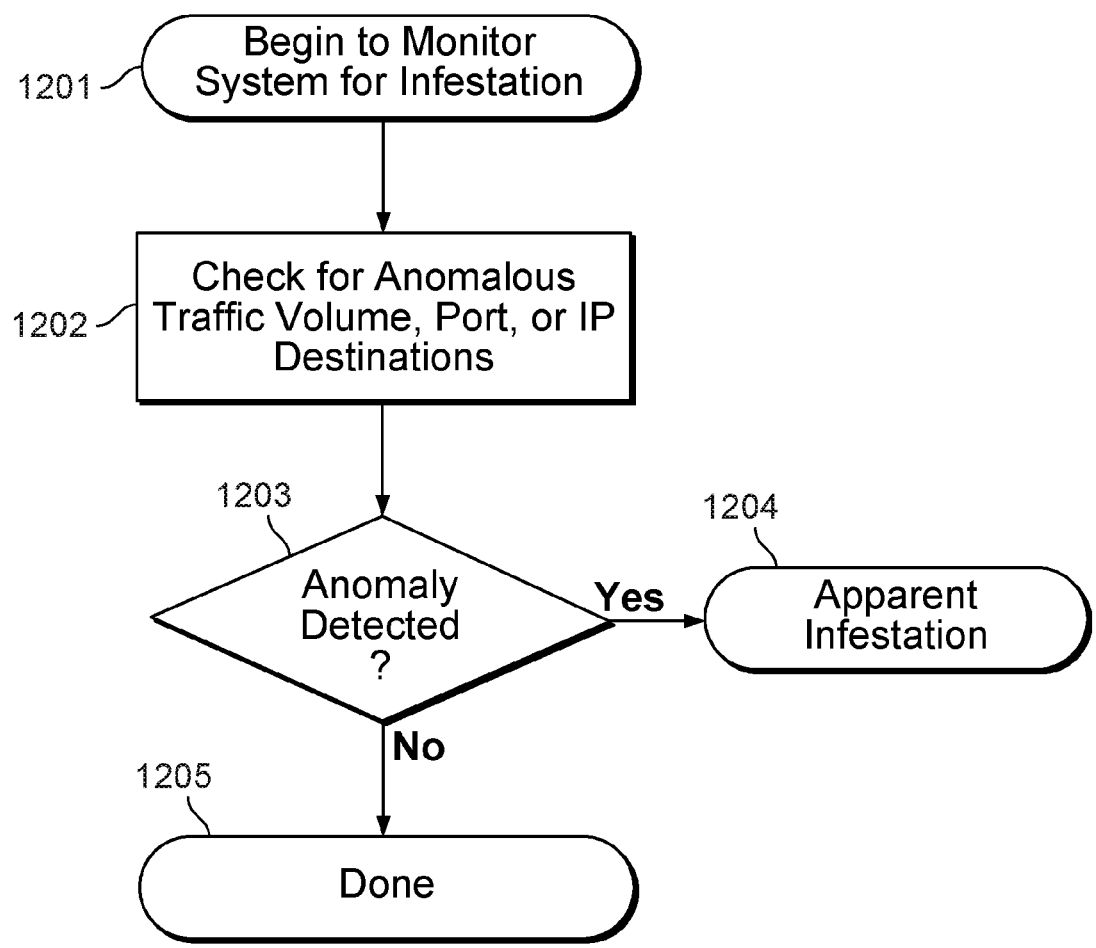
FIG. 12 is a flow diagram of a method for identifying an infestation according to some embodiments.

FIG. 12 is a flow diagram of a method for identifying an infestation according to some embodiments. In this example, a device near a computer, such as a firewall on a LAN or an ISP's router, is used in some embodiments to monitor a computer for infestation (1201). Network traffic is monitored for anomalous traffic volume, port, or IP destination (1202), for example by detecting large volumes of outbound traffic, such as email traffic or instant messaging traffic. Another example of anomalous traffic is a TCP/IP connection to a server that is known to control a collection of infested machines, in a way that suggests the connecting machine is controlled by the server, such as connecting and transmitting an assertion that it is controlled or available to comply. Another example of anomalous traffic is a connection to a computer that is a current target of a denial of service attack, with a pattern that is consistent with the attack, such as a connection to a targeted port, or the use of a falsified return IP address. In some embodiments, a falsified return address may be detected by a router, such as an ISP router, that is aware that the return address is not on the sourcing subnet, or not associated with the MAC address that has supplied the corresponding packets. If an anomaly is detected (1203) then an apparent infestation is noted (1204) in this example. In some embodiments, a response to infestation may include quarantining of the computer or network containing the computer, for example as discussed in conjunction with FIGS. 14, 15, and 16. In some embodiments, a response to infestation may include an attempt to remediate the problem, for example by inoculation, such as discussed in conjunction with FIG. 17. If no anomaly is detected (1203) then monitoring is complete (1205) in this example. In some embodiments, monitoring for anomalous traffic may be continuous. In some embodiments, monitoring for anomalous traffic may be periodic. For example, periodic monitoring may consist of monitoring some number of computers, such as 1 computer, for some period of time, such as 2 minutes, and then not monitoring those computers again for another period of time, such as 1 hour. As another example, periodic monitoring may be randomized, for example by changing the duration of monitoring, pattern of selecting computers to monitor, and/or the unmonitored duration, to be difficult or impossible to predict, for example by being driven by a pseudo random number generator, subject to restrictions of available monitoring computers.

Figure 13:
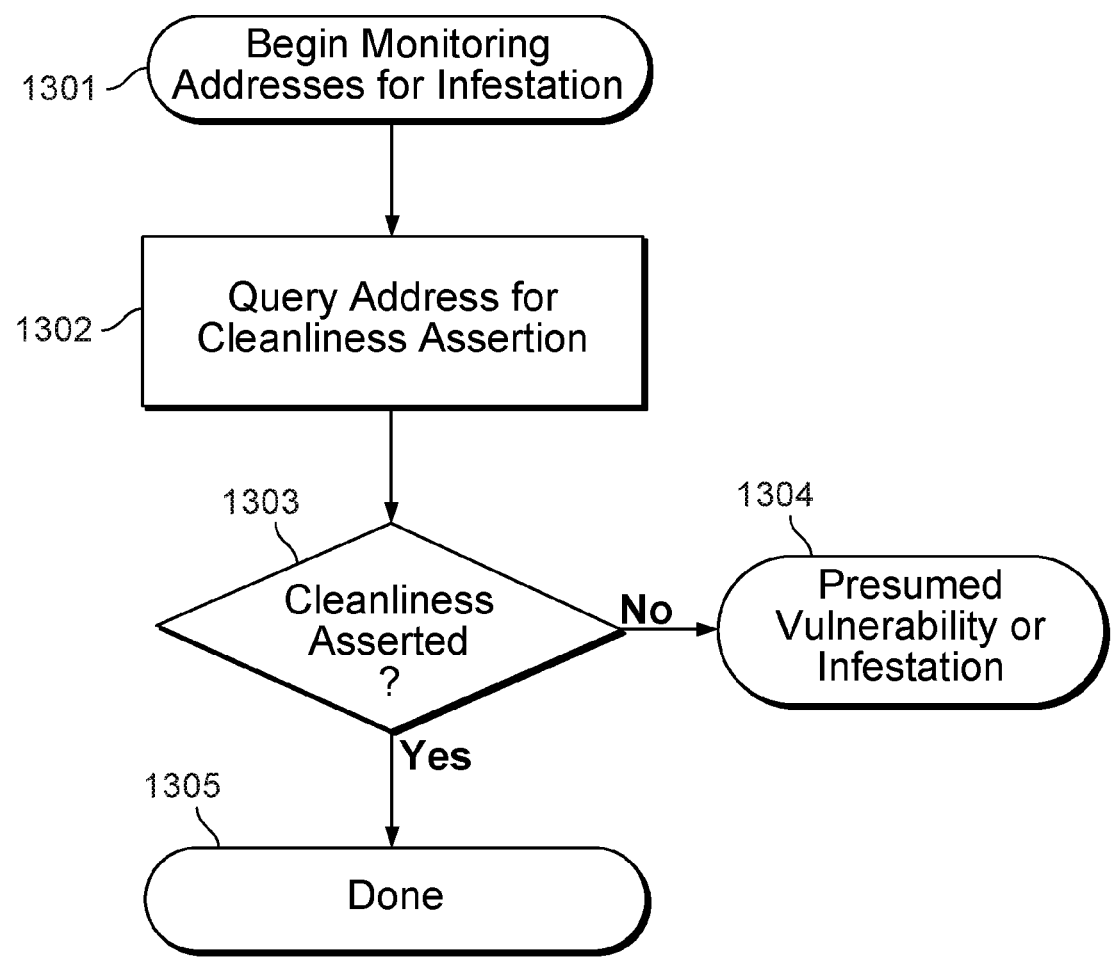
FIG. 13 is a flow diagram of a method for monitoring one or more computers for infestation according to some embodiments.

FIG. 13 is a flow diagram of a method for monitoring one or more computers for infestation according to some embodiments. In this example monitoring of a computer for infestation begins (1301), for example by retrieving a list of one or more addresses of computers, such as addresses of participating subscribers. In some embodiments, this list may be a list of addresses for some or all subscribers for a given ISP. In some embodiments, the list may be a list of IP addresses issued by a DHCP server, such as on a LAN, or a list of IP addresses observed by a router, such as a router on a LAN, or a complete list of IP addresses in a given subnet. A computer associated with an address identified in a list is queried for a cleanliness assertion (1302), for example by contacting a trusted computing base within a computer, and requesting an authenticated infestation scan by trusted software. An example of a trusted computing base within a computer is the Paladium security initiative under development by Microsoft and supported by Intel and American Micro Devices. Another example of a trusted computing base is described in various TCG specifications, such as the TCG Architecture Overview, published by the Trusted Computing Group. Trusted code bases may for example execute antivirus scans of the remainder of the computer, including untrusted portions of the disk and/or operating system. In some embodiments, trusted code bases may digitally sign assertions about the cleanliness (e.g. infestation status) and/or state of their computers. In some embodiments, the query for cleanliness (1302) may be responded to by anti-contagion software, such as antivirus software, with assertions about the currency of a scan, such as the last time a scan was performed, or a version associated with a current anti-contagion software or definition file in use, wherein a sufficiently updated software and/or scan may act as a cleanliness assertion. In some embodiments, an operating system may respond with information associated with its patch level, wherein a sufficiently recent patch level may be interpreted as an assertion of cleanliness. If a computer asserts it is clean (1303) then monitoring is complete (1305) in this example. If a cleanliness assertion is not provided (1303) then an infestation or vulnerability is presumed (1304) in this example.

FIG. 14 is a flow diagram of a method for quarantining a computer according to some embodiments. In this example, a decision has been made to quarantine a computer (1401), such as an ISP deciding to quarantine a subscriber, or a firewall or router for a LAN deciding to quarantine a local computer. In some embodiments, a decision to quarantine may be made based on apparent infestations or apparent vulnerabilities, for example as illustrated in conjunction with FIG. 11, 12, or 13. In some embodiments a decision to quarantine may be based on the accumulation of evidence above a threshold, such as a threshold of one such piece of evidence, or a threshold of two such pieces of evidence. In some embodiments, a decision to quarantine may be made based on configuration rules, for example all new computers must be quarantined until they have contacted their OS vendor and been updated, or by user specification, such as a user requesting a quarantine for a specific computer. In some embodiments, requests for a quarantine may be made on an individual computer via settings, such as control panel in Microsoft Windows, or through a user interface to a firewall or router, for example by specifying an IP address, name, or MAC address to quarantine, or a list of addresses that are not to be quarantined (where other addresses may be quarantined). During a quarantine period outbound traffic is detected (1402), for example by a device such as a router, or by a software network stack on the quarantined computer, or by an upstream device, such as a device at an ISP. Outbound traffic is tested in this example to see if it is associated with a remediation request (1403), such as contact with an appropriate anti-contagion software distributor, or contact with a security patch update provider, such as Microsoft Windows Update, or contact with a verified remediation site, such as an internal ISP site. If outbound traffic is deemed to be associated with a remediation request (1403), then the traffic is routed or forwarded to its destination (1404) in this example. If outbound traffic is not associated with a remediation request (1403), then, in this example, it is tested to see if it is an approved service request (1405), such as a request for a web page. If the request was for an approved service (1405) then, in this example, the request is re-routed to a special quarantine server (1407), such as an ISP web server that provides information and links to assist in remediation. Re-routing of request traffic may be accomplished in numerous ways, for example by providing an alternate DNS service that consistently returns a fixed IP address of a quarantine server in response to all DNS requests. Another example of re-routing a web page request is to respond with a redirect message, which would direct a browser on a quarantined computer to contact a quarantine server that provides remediation information. If the request was not for an approved service (1406), then the outbound traffic is discarded or responded to with in indication that the desired traffic destination is unreachable (1406) in this example.

FIG. 15 is a flow diagram of a method for quarantining a computer according to some embodiments. In this example, a decision has been made to quarantine a computer (1501), for example as described in conjunction with 1401 of FIG. 14. Inbound traffic originally destined for a quarantined computer is detected (1502), for example by a network device such as by a router. An example of detecting inbound traffic destined for a quarantined computer is to have a list of quarantined IP addresses, and filter or provide additional processing on traffic destined for an address on the list. Detected inbound traffic is tested in this example to see if it is remediation related (1503), such as a response to a remediation request. Direct responses to remediation requests may for example be identified using stateful packet inspection firewall techniques known to those skilled in the art. In various embodiments, at least certain types of traffic from approved sites such as anti-contagion vendors, security update providers, and/or internal ISP sites are deemed remediation related. If traffic is remediation related (1503) then it is forwarded to the quarantined computer (1504) in this example. If traffic is not remediation related (1503) then, in this example, it is discarded or responded to with a message indicating that the destination is unreachable (1507).

In some embodiments, a configuration based quarantine during an installation of an operating system, such as Microsoft Windows, may be automatically setup, for example by a default installation setting up restrictions in a firewall installed with the OS or by an installation setting defaults for use when network connectivity is enabled, that establishes a quarantine, for example restricting internet connections, for example allowing internet connections only to a security update site such as Microsoft Windows Update. In some embodiments, settings that may establish a quarantine, such as default settings in an operating system installation, may be altered programmatically to remove the quarantine in response to a remediation site, such as a security update service such as Microsoft Windows Update, asserting that there are no other security updates pending. In some embodiments, configuration settings that may establish a quarantine may be altered programmatically to enable a quarantine in response to the presence of one or more security updates, such as provided by an operating system update service such as Microsoft Windows Update, that are available for installation on a computer.

Figure 16:
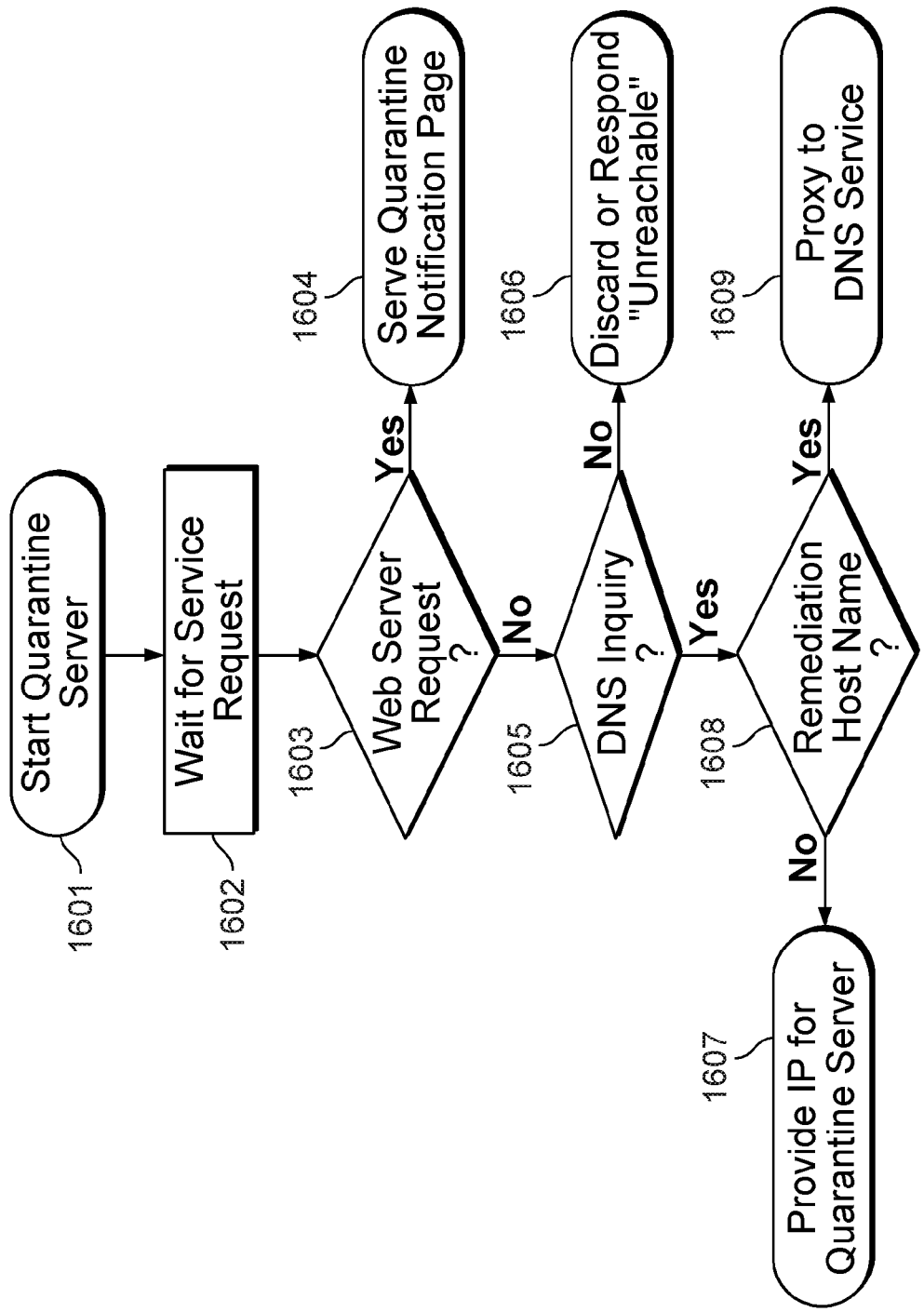
FIG. 16 is a flow diagram of a method for a quarantine server to respond to requests according to some embodiments.

FIG. 16 is a flow diagram of a method for a quarantine server to respond to requests according to some embodiments. In this example, a quarantine server is started (1601), for example by starting a web server, or DNS server, or proxy server, or ftp server, or some combination server. The server waits for a request (1602), for example by listening on a port and waiting for a connection. In some embodiments, a device such as a router may forward outbound traffic from a quarantined computer to a quarantine server, for example as illustrated in conjunction with 1407 of FIG. 14. If a received connection is a web server request (1603), such as an HTTP request, then the server responds with a quarantine notification page (1604) in this example. An example of a quarantine notification page is a web page that provides notification that the computer is quarantined, and/or provides links to remediation sites appropriate to the quarantine, such as a link to a site that provides anti-contagion software for removing a virus that the quarantined computer is believed to contain. The links on the quarantine notification page may be examples of HTTP addresses that are for use in remediation. Another example of a quarantine notification page is a page that redirects to a quarantine notification page. If the request is not a web server request (1603), then it is tested to see if it is a DNS inquiry (1605) in this example. A DNS inquiry may for example appear on port 53 using TCP/IP or UDP. If the request is not a DNS inquiry (1605) then it may be discarded or responded to as "unreachable" (1606) in this example. If the request is a DNS inquiry (1605) then, in this example, the inquiry is tested to see if it is a DNS request for a remediation host name (1608). A remediation host name may include a host name as appropriate to the reason for a quarantine, such as a host providing anti-contagion software, or a host providing security updates, or a host internal to (or partnered with) an ISP. If the DNS inquiry was for a remediation host name (1608) then the request is proxied to an external DNS service provider (1609) in this example. A proxy to a DNS service (1609) may return a stored or cached response, such as the actual IP address of the host name, or it may contact an external DNS service to relay back the proposed IP address. If the DNS inquiry was not for a remediation host name (1608) then an IP address for a quarantine server is provided (1607) in this example. In some embodiments, when a redirected IP address is provided, such as that of a quarantine server, the DNS response may include a short time to live, for example 0 seconds. A short time to live ensures that a further DNS query will be sent prior to subsequent communications being sent from the quarantined computer to the host that was the subject of the DNS query, aiding a return to normal routing of traffic once the computer is no longer under quarantine. In some embodiments, the server(s) in this example may continue to wait for a service request (1602) in parallel with the processing of the requests as described above, or may wait for a service request again after disposition of the previous request as described above.

Figure 17:
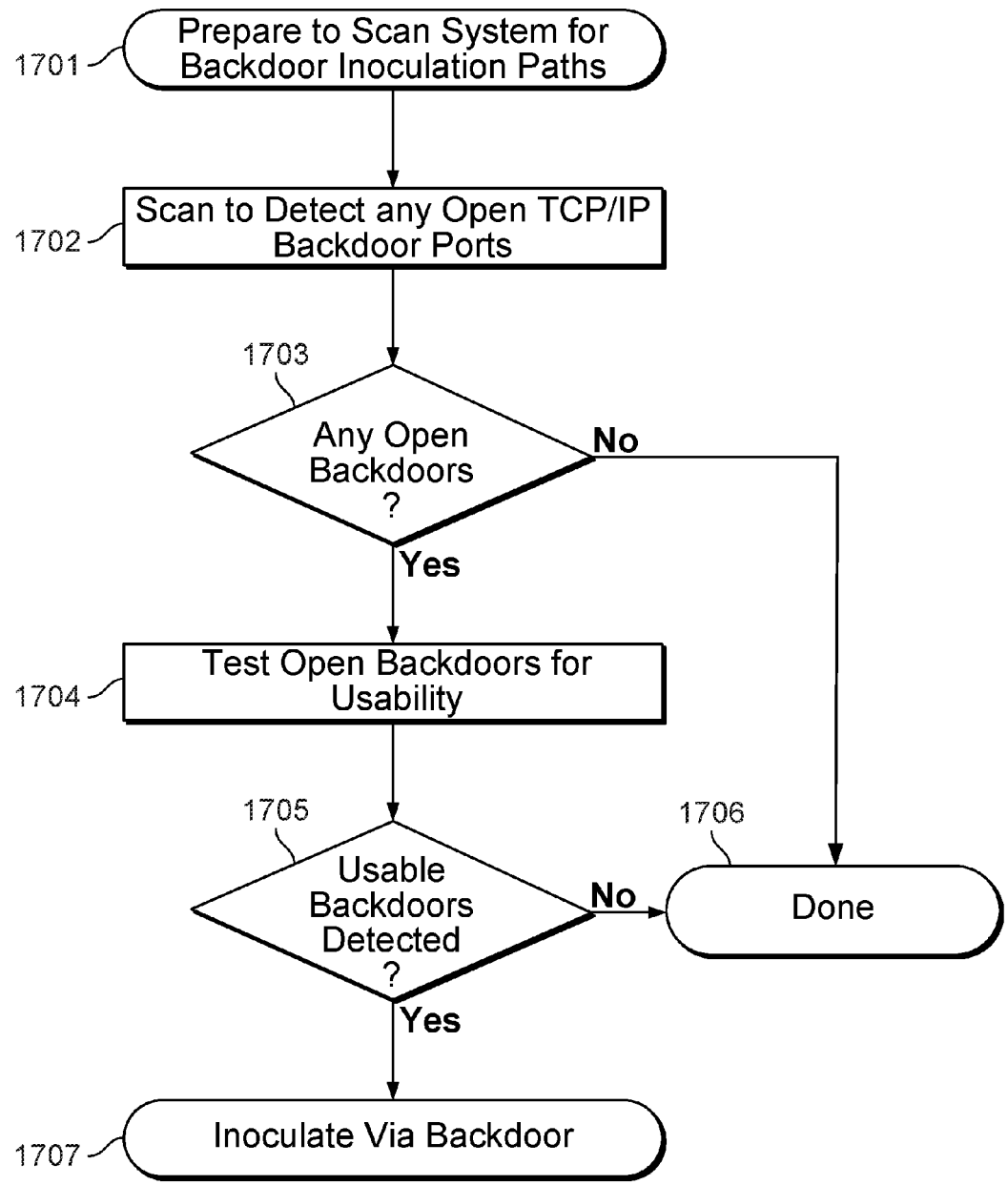
FIG. 17 is a flow diagram of a method for scanning backdoors and inoculating according to some embodiments.

FIG. 17 is a flow diagram of a method for scanning backdoors and inoculating according to some embodiments. In this example, preparations are made for scanning a computer for a backdoor inoculation path (1701), for example by identifying the computer to be scanned, and enumerating or retrieving a list of one or more backdoors. In one example, an IP address to be scanned may be selected by an ISP from a list of subscribers. In one example, a list of backdoors may include information associated with pre-loaded software approved by the computer owner for access and inoculation purposes, such as an ISP provided utility that is installed by the subscriber. In some embodiments, an ISP defined backdoor may have an authentication protocol to preclude control by unauthorized parties, such as restrictions on IP address(es) that may contact the backdoor, or shared secrets such as a password required by the sender, or cryptographic authentication such as client authentication on an SSL connection. In some embodiments, a user is requested and/or required to authorize in advance use of an authorized and/or any unauthorized backdoor for purposes of inoculation. As another example, a list of backdoors may include virus or worm installed backdoors, such as those installed by a SubSeven virus or Back Orifice. As another example, backdoors may include exploitable security vulnerabilities, such as a weakness in a web server, or a weakness in an RPC service. A scan may optionally be conducted to detect open TCP/IP backdoor ports (1702) similarly to the scan discussed in conjunction with FIG. 11. If none of the backdoors are open (1703), for example there is no response on any of the ports, then the scan is complete (1706) in this example. If one or more backdoor ports are open (1703) then they are tested for usability (1704) in this example. In some embodiments, a backdoor port may be assumed open (1703) and may be tested for usability (1704) without an independent test to see if the port is open. An example of a usability test is no test at all, with the conclusion that a specific port is usable any time it is open. Another example of a usability test is based on the receipt of confirmation of a functional installation of ISP provided backdoor software, such as a confirmation that may be provided by the installed software. Another example of a usability test involves the use of a less invasive test of vulnerabilities such a buffer overrun exploit that does not have a permanent impact but provides observable validation (such as a dropped connection). If a backdoor is usable (1705) then the computer is inoculated via a backdoor (1707) in this example. One example of such an inoculation is the remotely controlled download of one or more remedy files into one or more directories, such as an operating system directory, such as the "\windows\system" directory in Microsoft Windows 2000. Another example of an inoculation is the download of an executable file to the computer, followed by the execution of that file. Another example of an inoculation is the download of a data file, such as an anti-contagion signature file, that is interpreted or processed by another executable already on the computer. Another example of an inoculation is the deletion of one or more files from the computer. Another example of an inoculation is the editing of one or more registry entries, or of one or more files, such as deleting, appending or rewriting entries in a registry or file. Another example of inoculation includes a combination of one or more of above techniques, optionally in conjunction with one or more remotely instigated reboot operations. Another example of inoculation includes a combination of one or more of the above techniques, along with an optional dialog box requesting a user's permission to proceed with the inoculation. Another example of inoculation is the use of a dialog box in conjunction with a timer that causes the inoculation to proceed if no user response is given in a prescribed period of time, such as 1 hour.

Figure 18:
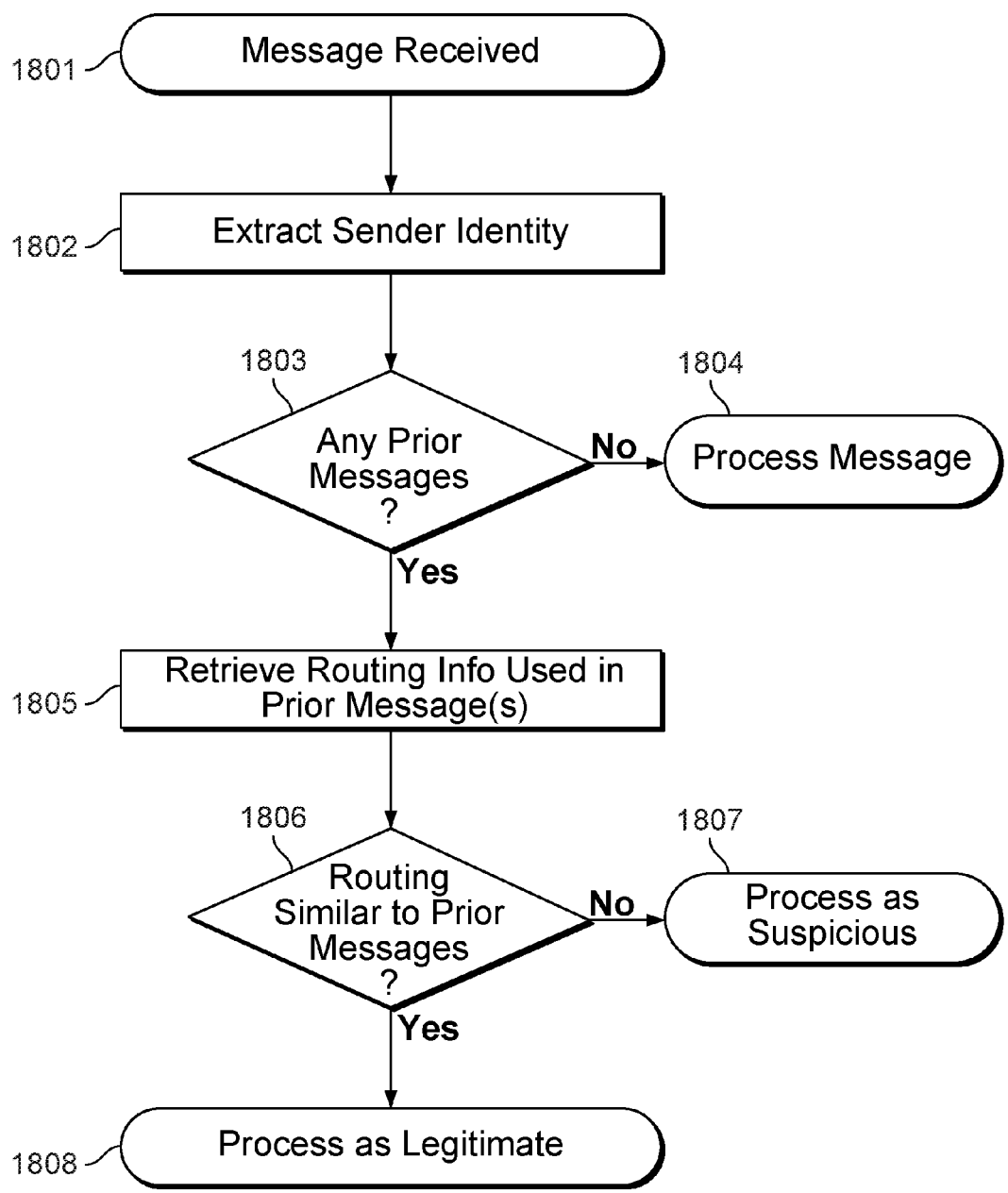
FIG. 18 is a flow diagram of a method for categorizing messages according to some embodiments.

FIG. 18 is a flow diagram of a method for categorizing messages according to some embodiments. In this example, a message is received (1801), such as an email message or instant message. The purported sender's identity is extracted (1802), for example by examining the "From:" header line in an email message, or by examining the envelope information conveying an email message, or by examining the sender's ID in an instant message. A check is performed to see if the sender has sent any prior messages (1803), for example by scanning an inbox of prior email, or by checking for the sender in a buddy list. If there were no prior messages from the sender (1803) then the message is processed (1804) in this example. Processing the message may for example include presenting the message to the user, and/or recording routing information for comparison and categorization of future messages. If there were prior messages from the sender (1803) then routing information used in prior messages is retrieved (1805) in this example. Routing information may for example be extracted from the header in email. Routing information may for example be obtained during an instant message session by retrieving the IP address of the party being communicated with, for example as is done when an instant message session coordinates a peer-to-peer activity such as a direct file transfer with a remote party. In some embodiments, routing information may be stored implicitly, such as in headers of a previously received message, or explicitly, for example by extracting routing information and storing it in a database or file system. Routing information for the current message is compared to prior messages (1806), for example by checking that the IP address for the party being communicated with is in a similar subnet, or allocated within the same geographical region, for example the same continent, as a previous IP address for the same party. IP address to geographical location may be estimated by various software applications and services, such as services provided by MaxMind and described on http://www.maxmind.com. In some embodiments, routing information for an email message may be deduced by examining header information related to mail transfer agents. In some embodiments, similarity in IP addresses for mail transfer agents may be interpreted as implying similar routing. If routing is similar to previous messages from the same sender (1806), then the message is processed as legitimate (1808) in this example. If the routing information for a message purporting to be from a sender is not similar to previous messages from the same sender (1806) then the message is processed as suspicious (1807) in this example. In some embodiments, processing as suspicious may include contributing to a scoring that labels the message as an undesirable message, such as spam, viral, or phishing. In some embodiments, higher probability suspicious messages may be scrutinized further, or may be restricted to some extent in their impact on the computer. An example of restricting impact of a message may include discarding the message. Another example of restricting impact or further scrutiny of a message may include placing a message in a spam inbox. Another example of a restricting impact of a message may include preventing execution of content contained in the message, and/or requiring additional user interactions to bypass the restriction, for example by having a user agree to ignore warnings which describe the suspicious circumstances. In various embodiments, the process of FIG. 18 is implemented on a mail, messaging, or other server associated with the sender and/or the sender's ISP; a mail, messaging, or other server associated with the recipient and/or the recipient's ISP; and/or one or more intermediate nodes.

Figure 19A:
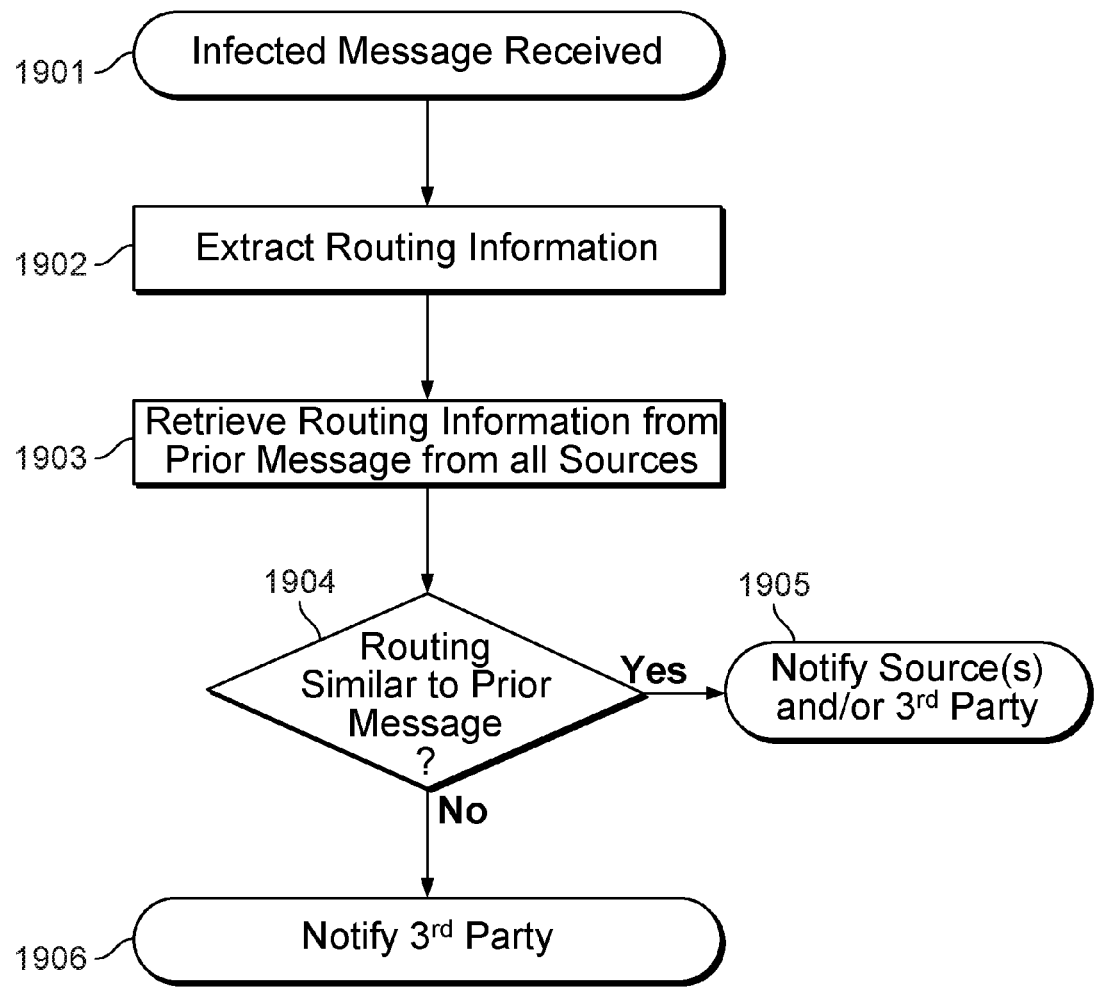
FIG. 19A is a flow diagram of a method for notifying possible sources of infection according to some embodiments.

FIG. 19A is a flow diagram of a method for notifying possible sources of infection according to some embodiments. In this example, an infected message is received (1901). An example of an infected message is a message classified as such by anti-contagion software. Routing information is extracted from the message (1902). An example of extracting routing information in an email message is to extract header lines inserted by mail transfer agents that propagated the message. Another example of extracting routing information is to acquire an IP address of a party making contact via instant messaging, for example as is provided by AOL's instant message infrastructure for a peer-to-peer file transfer. Routing information from previously received messages is retrieved (1903). An example of retrieving email routing information from prior messages is scanning all received messages, such as messages in an email inbox, and extracting routing information. Another example of retrieving routing information is to query a database or file system where routing information from previous messages has been gathered. Routing information for the infected message is compared with the retrieved routing information (1904). If no similarity with previous messages is found (1904) then in this example a third party notification is made (1906). An example of a third party notification is sending notification to the ISP that provides network access to the message source. Another example of notifying a third party is notifying a viral clearinghouse of the apparent source of a viral message. Another example of a notifying a third party is notifying a service that determines the credibility of a report, such as a collaborative filter service, that accumulates accusations of viral disseminations. In some embodiments, similarity of routing of an infected message with a previous message may include having a previous message from the IP address of the infected message source. If a similarity is found with previous messages (1904) then in this example a notification is sent (1905). In some embodiments, notification may be sent (1905) to one or more sources of the prior message(s) that best match the infected message, and/or to third parties. As an example, notification may be sent to an email source that had the same originating IP address as the infected message. In some embodiments, a user may be asked to approve notification(s), for example via a pop-up dialog. In some embodiments, notification may be automatically sent without user intervention.

Figure 19B:
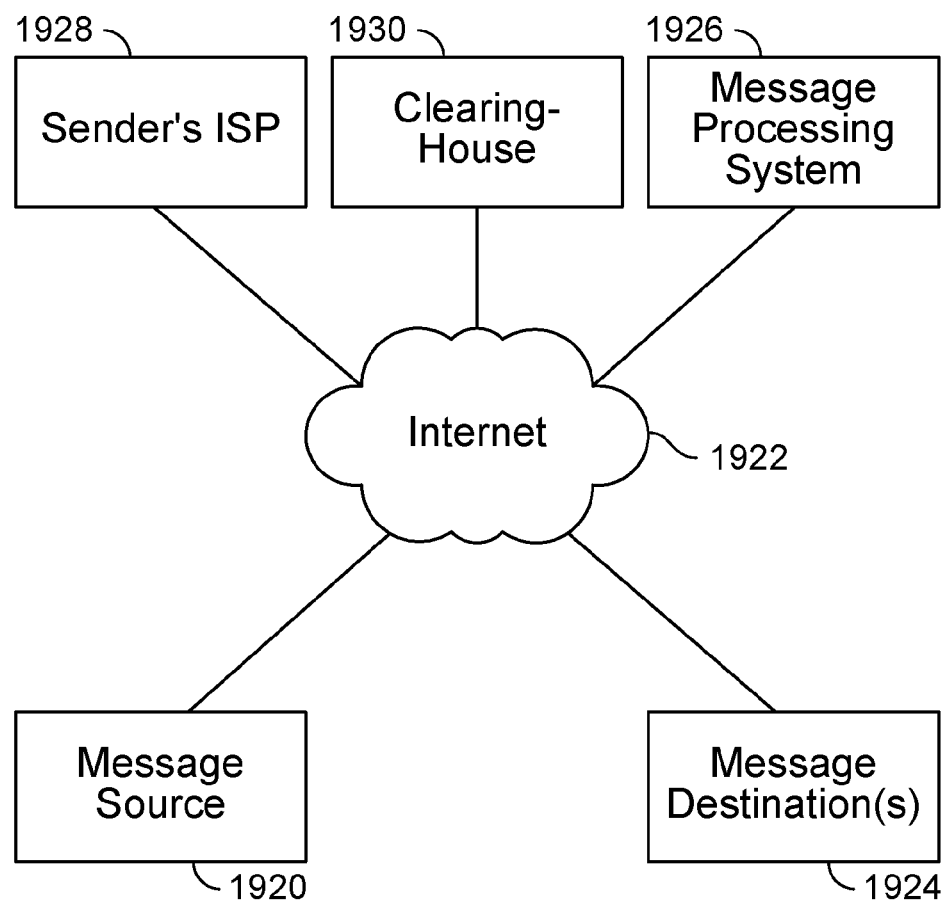
FIG. 19B is a block diagram illustrating a network environment in which suspicious messages are identified and/or one or more notifications are sent when a malicious message is detected.

FIG. 19B is a block diagram illustrating a network environment in which suspicious messages are identified and/or one or more notifications are sent when a malicious message is detected. A message source 1920 sends a message via the Internet 1922 to a message processing system 1926 for delivery via the Internet to one or more message destinations 1924. In various embodiments, the message processing system 1926 comprises a mail or messaging server associated with the message source 1920, a mail or messaging server associated with the destination(s) 1924, and/or an intermediate processing node. In some embodiments, the message source 1920 is connected directly and/or via a local network, and not via the Internet 1922 as shown in FIG. 19B, to message processing system 1926. In some embodiments, message processing system 1926 is configured to identify suspicious messages using current and historic routing information, e.g., as described above in connection with FIG. 18. In some embodiments, the process of FIG. 19A is implemented on message processing system 1926. For example, in some embodiments if message processing system 1926 determines that a message sent by message source 1920 is infected, message processing system 1926 compares routing information associated with the malicious message with corresponding information for one or more messages received previously from the message source 1920. If the routing information is similar, in some embodiments the message processing system 1926 notifies the message source 1920. If the routing information is not similar, in various embodiments the message processing system 1926 notifies the message source 1920, the sender's ISP 1928, and/or a clearinghouse or similar applicable service 1930, as described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting an insecure condition on a first host that has connected or is attempting to connect to a protected network, wherein detecting the insecure condition includes contacting a trusted computing base associated with a trusted platform module within the first host, receiving a response, and determining whether the response includes a valid digitally signed attestation of cleanliness, wherein the valid digitally signed attestation of cleanliness includes at least one attestation selected from the group consisting of an attestation that the trusted computing base has ascertained that the first host is not infested, and an attestation that the trusted computing base has ascertained the presence of a patch or a patch level associated with a software component on the first host;
   when it is determined that the response does not include a valid digitally signed attestation of cleanliness, quarantining the first host, including by preventing the first host from sending data to one or more other hosts associated with the protected network, wherein preventing the first host from sending data to one or more other hosts associated with the protected network includes receiving a service request sent by the first host, determining whether the service request sent by the first host is associated with a remediation request, and when it is determined that the service request sent by the first host is not associated with a remediation request, serving a quarantine notification page that provides remediation information to the first host if the service request sent by the first host comprises a web server request, wherein serving the quarantine notification page to the first host includes re-routing by responding to the service request sent by the first host with a redirect that causes a browser on the first host to be directed to a quarantine server configured to serve the quarantine notification page; and
   permitting the first host to communicate with a remediation host configured to provide data usable to remedy the insecure condition.

2. A method as recited in claim 1, wherein detecting the insecure condition further includes at least one of the group consisting of scanning for a vulnerability, scanning for malicious data, determining whether a security software is installed, and detecting anomalous network traffic.

3. A method as recited in claim 1, wherein detecting the insecure condition includes determining that the first host should be quarantined until an update to an operating system has been installed.

4. A method as recited in claim 1, wherein permitting the first host to communicate with the remediation host includes:
   detecting an outbound communication from the first host; and
   forwarding the outbound communication if it is addressed to the remediation host.

5. A method as recited in claim 1, wherein quarantining the first host further includes preventing the first host from receiving via the protected network data not related to remediation of the insecure condition.

6. A method as recited in claim 1, performed at an Internet service provider.

7. A method as recited in claim 1, wherein the software component on the first host is an operating system.

8. A method as recited in claim 1, wherein determining that the response does not include a valid digitally signed attestation of cleanliness includes determining that the software component on the first host is not sufficiently updated.

9. A method as recited in claim 8, wherein determining that the software component on the first host is not sufficiently updated includes determining that a patch level associated with the software component on the first host is not sufficiently recent.

10. A system, comprising:
   a processor configured to:
      detect an insecure condition on a first host that has connected or is attempting to connect to a protected network, wherein detecting the insecure condition includes contacting a trusted computing base associated with a trusted platform module within the first host, receiving a response, and determining whether the response includes a valid digitally signed attestation of cleanliness, wherein the valid digitally signed attestation of cleanliness includes at least one attestation selected from the group consisting of an attestation that the trusted computing base has ascertained that the first host is not infested, and an attestation that the trusted computing base has ascertained the presence of a patch or a patch level associated with a software component on the first host;
      when it is determined that the response does not include a valid digitally signed attestation of cleanliness, quarantine the first host, including by preventing the first host from sending data to one or more other hosts associated with the protected network, wherein preventing the first host from sending data to one or more other hosts associated with the protected network includes receiving a service request sent by the first host, determining whether the service request sent by the first host is associated with a remediation request, and when it is determined that the service request sent by the first host is not associated with a remediation request, serving a quarantine notification page that provides remediation information to the first host if the service request sent by the first host comprises a web server request, wherein serving the quarantine notification page to the first host includes re-routing by responding to the service request sent by the first host with a redirect that causes a browser on the first host to be directed to a quarantine server configured to serve the quarantine notification page; and
      permit the first host to communicate with a remediation host configured to provide data usable to remedy the insecure condition; and
   a memory coupled to the processor and configured to provide instructions to the processor.

11. A system as recited in claim 10, wherein the processor is configured to detect an insecure condition at least in part by performing one or more of the following: scanning for a vulnerability, scanning for malicious data, determining whether a security software is installed, and detecting anomalous network traffic.

12. A system as recited in claim 10, wherein the processor is configured to detect an insecure condition at least in part by determining that an initial startup after installation of an operating system is being performed.

13. A system as recited in claim 10, wherein the processor is configured to quarantine the first host at least in part by preventing the first host from receiving via the protected network data not related to remediation of the insecure condition.

14. A system as recited in claim 10, wherein the software component on the first host is an operating system.

15. A system as recited in claim 10, wherein determining that the response does not include a valid digitally signed attestation of cleanliness includes determining that the software component on the first host is not sufficiently updated.

16. A system as recited in claim 15, wherein determining that the software component on the first host is not sufficiently updated includes determining that a patch level associated with the software component on the first host is not sufficiently recent.

17. A computer program product, the computer program product being embodied in a non-transitory computer readable medium and comprising computer instructions for:
   detecting an insecure condition on a first host that has connected or is attempting to connect to a protected network, wherein detecting the insecure condition includes contacting a trusted computing base associated with a trusted platform module within the first host, receiving a response, and determining whether the response includes a valid digitally signed attestation of cleanliness, wherein the valid digitally signed attestation of cleanliness includes at least one attestation selected from the group consisting of an attestation that the trusted computing base has ascertained that the first host is not infested, and an attestation that the trusted computing base has ascertained the presence of a patch or a patch level associated with a software component on the first host;
   when it is determined that the response does not include a valid digitally signed attestation of cleanliness, quarantining the first host, including by preventing the first host from sending data to one or more other hosts associated with the protected network, wherein preventing the first host from sending data to one or more other hosts associated with the protected network includes receiving a service request sent by the first host, determining whether the service request sent by the first host is associated with a remediation request, and when it is determined that the service request sent by the first host is not associated with a remediation request, serving a quarantine notification page that provides remediation information to the first host if the service request sent by the first host comprises a web server request, wherein serving the quarantine notification page to the first host includes re-routing by responding to the service request sent by the first host with a redirect that causes a browser on the first host to be directed to a quarantine server configured to serve the quarantine notification page; and permitting the first host to communicate with a remediation host configured to provide data usable to remedy the insecure condition.

18. A computer program product as recited in claim 17, wherein the software component on the first host is an operating system.

19. A computer program product as recited in claim 17, wherein determining that the response does not include a valid digitally signed attestation of cleanliness includes determining that the software component on the first host is not sufficiently updated.

20. A computer program product as recited in claim 19, wherein determining that the software component on the first host is not sufficiently updated includes determining that a patch level associated with the software component on the first host is not sufficiently recent.

\* \* \* \* \*